US012779951B2

(12) United States Patent
Imamura

(10) Patent No.: US 12,779,951 B2
(45) Date of Patent: Nov. 3, 2026

(54) SYSTEMS, METHODS AND APPARATUSES FOR ELECTRONIC AIR PURIFICATION IN PUBLIC TRANSIT VEHICLES

(71) Applicant: Climate Comfort Technologies, Inc., Commerce City, CO (US)

(72) Inventor: John Imamura, Boulder, CO (US)

(73) Assignee: Climate Comfort Technologies, Inc., Commerce City, CO (US)

( * ) Notice: Subject to any disclaimer, the term of this patent is extended or adjusted under 35 U.S.C. 154(b) by 317 days.

(21) Appl. No.: 18/553,613

(22) PCT Filed: Apr. 8, 2022

(86) PCT No.: PCT/US2022/024100
§ 371 (c)(1),
(2) Date: Oct. 2, 2023

(87) PCT Pub. No.: WO2022/217109
PCT Pub. Date: Oct. 13, 2022

(65) Prior Publication Data

US 2024/0359537 A1 Oct. 31, 2024

Related U.S. Application Data

(60) Provisional application No. 63/172,367, filed on Apr. 8, 2021.

(51) Int. Cl.
*B60H 3/00* (2006.01)
*B01D 53/32* (2006.01)
(Continued)

(52) U.S. Cl.
CPC ......... *B60H 3/0078* (2013.01); *B01D 53/323* (2013.01); *B03C 3/04* (2013.01);
(Continued)

(58) Field of Classification Search
CPC .......... B01D 2257/708; B01D 2257/90; B01D 2257/91; B01D 2258/06;
(Continued)

(56) References Cited

U.S. PATENT DOCUMENTS 3,734,342 A * 5/1973 Patterson ............... H02G 3/081 220/327
5,848,718 A * 12/1998 Colwell ................ H02G 3/081 220/3.94
(Continued)

FOREIGN PATENT DOCUMENTS

BR 102014019097 A2 4/2016
CN 201682176 U * 12/2010
(Continued)

OTHER PUBLICATIONS

Thomas, Shane, "International Search Report and the Written Opinion of the International Searching Authority for PCT Application No. PCT/US22/24100," Jul. 27, 2022, 71 pages.

*Primary Examiner* — Jennifer Dieterle
*Assistant Examiner* — Sonji Turner
(74) *Attorney, Agent, or Firm* — NOD Law PC

(57) ABSTRACT

A high shock environment resistant electronic air purification system positioned within a heating, ventilation, and air conditioning (HVAC) system of a public transit vehicle effective to remove particulate pollutants therefrom. The air purification system comprises a central power box affixed to at least the interior surface of the public transit vehicle and at least one ion emitter positioned remotely from the central power box. The at least one ion emitter is configured to disperse ions into the interior space of the public transit vehicle affixed at least one interior surface of at least at one of in a return air plenum, at an entrance to an evaporator blower motor, or within a passenger air duct of the HVAC
(Continued)

system of the public transit vehicle without blocking or substantially restricting an airflow of the HVAC system.

20 Claims, 18 Drawing Sheets

(51) Int. Cl.
*B03C 3/04* (2006.01)
*B03C 3/41* (2006.01)
*B03C 3/66* (2006.01)
*B03C 3/82* (2006.01)

(52) U.S. Cl.
CPC .................. *B03C 3/41* (2013.01); *B03C 3/66* (2013.01); *B03C 3/82* (2013.01); *B01D 2257/708* (2013.01); *B01D 2257/90* (2013.01); *B01D 2257/91* (2013.01); *B01D 2258/06* (2013.01); *B01D 2259/4566* (2013.01); *B01D 2259/818* (2013.01); *B03C 2201/10* (2013.01); *B03C 2201/30* (2013.01)

(58) Field of Classification Search
CPC .... B01D 2259/4566; B01D 2259/4575; B01D 2259/818; B01D 53/32; B01D 53/323; B60H 1/00371; B60H 3/0078; B60H 3/0071; B03C 2201/10; B03C 2201/30
See application file for complete search history.

(56) References Cited

U.S. PATENT DOCUMENTS

| | | | | |
|---|---|---|---|---|
| 9,518,489 | B1 * | 12/2016 | Yip | F01N 3/0892 |
| 9,660,425 | B1 * | 5/2017 | Sunshine | H01T 23/00 |
| 9,847,623 | B2 * | 12/2017 | Sunshine | H01T 23/00 |
| 9,849,208 | B2 * | 12/2017 | Waddell | H01J 33/02 |
| 9,925,567 | B2 * | 3/2018 | Waddell | B01D 53/32 |
| 10,128,075 | B2 * | 11/2018 | Waddell | H01J 27/022 |
| 10,137,459 | B2 * | 11/2018 | Guthrie | B03C 3/04 |
| 10,322,205 | B2 * | 6/2019 | Waddell | H01J 33/02 |
| 10,786,818 | B2 * | 9/2020 | Galbreath | B03C 3/41 |
| 10,974,256 | B1 * | 4/2021 | Galbreath | B64D 13/06 |
| 11,141,740 | B2 * | 10/2021 | Galbreath | B64D 13/06 |
| 11,491,496 | B1 * | 11/2022 | Galbreath | B64D 13/06 |
| 2004/0031248 | A1 | 2/2004 | Lindsay | |
| 2010/0018398 | A1 * | 1/2010 | Krell | B03C 3/49 96/27 |
| 2012/0056541 | A1 * | 3/2012 | Mamiya | B03C 3/383 315/111.81 |
| 2016/0190772 | A1 * | 6/2016 | Sunshine | H01T 23/00 361/231 |
| 2019/0247862 | A1 * | 8/2019 | Galbreath | B64D 13/06 |
| 2021/0197207 | A1 * | 7/2021 | Galbreath | B64D 13/06 |

FOREIGN PATENT DOCUMENTS

| | | | | | |
|---|---|---|---|---|---|
| CN | 109130792 | A | * | 1/2019 | B60H 3/0078 |
| KR | 20170007003 | A | | 1/2017 | |
| KR | 20200001474 | U | * | 7/2020 | F24F 8/30 |
| WO | WO-2007078135 | A1 | * | 7/2007 | B60H 3/0078 |

* cited by examiner

SYSTEMS, METHODS AND APPARATUSES FOR ELECTRONIC AIR PURIFICATION IN PUBLIC TRANSIT VEHICLES

CROSS REFERENCE TO RELATED APPLICATION

This patent application claims the benefit and priority from International Patent Application No. PCT/US2022/024100, filed on Apr. 8, 2022, and from U.S. 63/172,367, filed on Apr. 8, 2021, which International Patent Application No. PCT/US2022/024100 claims priority to; the disclosure of each is incorporated by reference herein in its entirety as part of the present application.

FIELD OF THE DISCLOSURE

The present disclosure relates generally to air purification for heating, ventilation, and air conditioning (HVAC). In particular, but not by way of limitation, the present disclosure relates to systems, methods and apparatuses for electronic air purification in public transit vehicles.

BACKGROUND OF THE DISCLOSURE

Public transit systems are ubiquitous, especially in large urban areas, and are an efficient means for transporting people in a reliable and timely manner. In many respects, public transit systems are not only faster than personal transportation, but they also serve to reduce air pollution and traffic congestion in densely populated areas. Despite the many advantages of public transportation, buses, trams, and metro systems are notorious for having poor passenger air quality owing to particulates, contagions, and other air pollutants, even with on-board filtration and HVAC systems.

Various methods for enhancing air quality in transit systems have been attempted, with little to no success. One method involves the use of ion generating bulbs or tubes. However, the bulbs and tubes have a short lifespan and need to be replaced often, making their adoption unfeasible for public transit systems. Another approach involves the use of ultraviolet (UV) lights. Besides the obvious negative health effects, UV radiation also has the downside of being unable to remove air particulate matter and dust, making its adoption less than ideal.

Yet another hurdle of air purification in public transit systems is integrating with compact HVAC systems. Many HVAC systems on public transit vehicles are relatively compact compared to their counterparts in office buildings, apartments, homes, etc. Further, public transit vehicles operate in high shock environments with more dust and vibration than static structures, and higher temperature swings and max/min temperatures than well-insulated buildings. Thus, effective air treatment strategies, such as air ionization, as utilized in other applications, such as buildings, are typically unsatisfactory for use in public transit systems. There is therefore a need in the art for an air ionization purification system capable of withstanding high shock environments, large temperature swings and ranges, and designed to fit within the compact HVAC system of public transit vehicles.

SUMMARY OF THE DISCLOSURE

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Aspects disclosed herein address the above stated needs by disclosing a high shock environment resistant electronic air purification system positioned within a heating, ventilation, and air-conditioning (HVAC) system of a public transit vehicle effective to remove particulate pollutants therefrom, comprising: a central power box positioned within and on an interior surface of the public transit vehicle and configured for voltage management, comprising: a housing configured to house a first fuse and a housing interior circuitry, and at least two extendable emitter connectors electrically coupled through the housing to the housing interior circuitry: the first fuse coupled to the housing interior circuitry and configured to disrupt operation of the central power box in the event of a power overload; wherein one or more first fasteners are configured to affix the central power box to at least the interior surface of the public transit vehicle without blocking or substantially restricting airflow of the HVAC system of the public transit vehicle; and at least one ion emitter positioned remotely from the central power box, and within the HVAC system of the public transit vehicle, comprising: an ion emitter enclosure configured to house an ion emitter interior circuitry, one or more air ionizers coupled to the ion emitter interior circuitry, extending through the ion emitter enclosure, and configured to generate ions, and the ions configured to be dispersed by the HVAC system within an interior space of the public transit vehicle and attach to particulates in the air and exposed surfaces within the interior space of the public transit vehicle, wherein one or more second fasteners are configured to affix the at least one ion emitter to at least one interior surface of at least at one of in a return air plenum, at an entrance to an evaporator blower motor, or within a passenger air duct of the HVAC system of the public transit vehicle without blocking or substantially restricting an airflow of the HVAC system.

BRIEF DESCRIPTION OF THE DRAWINGS

The objects, features, and attendant advantages of the present disclosure are fully appreciated as the same becomes better understood when considered in conjunction with the accompanying drawings.

DETAILED DESCRIPTION

Figure 1:
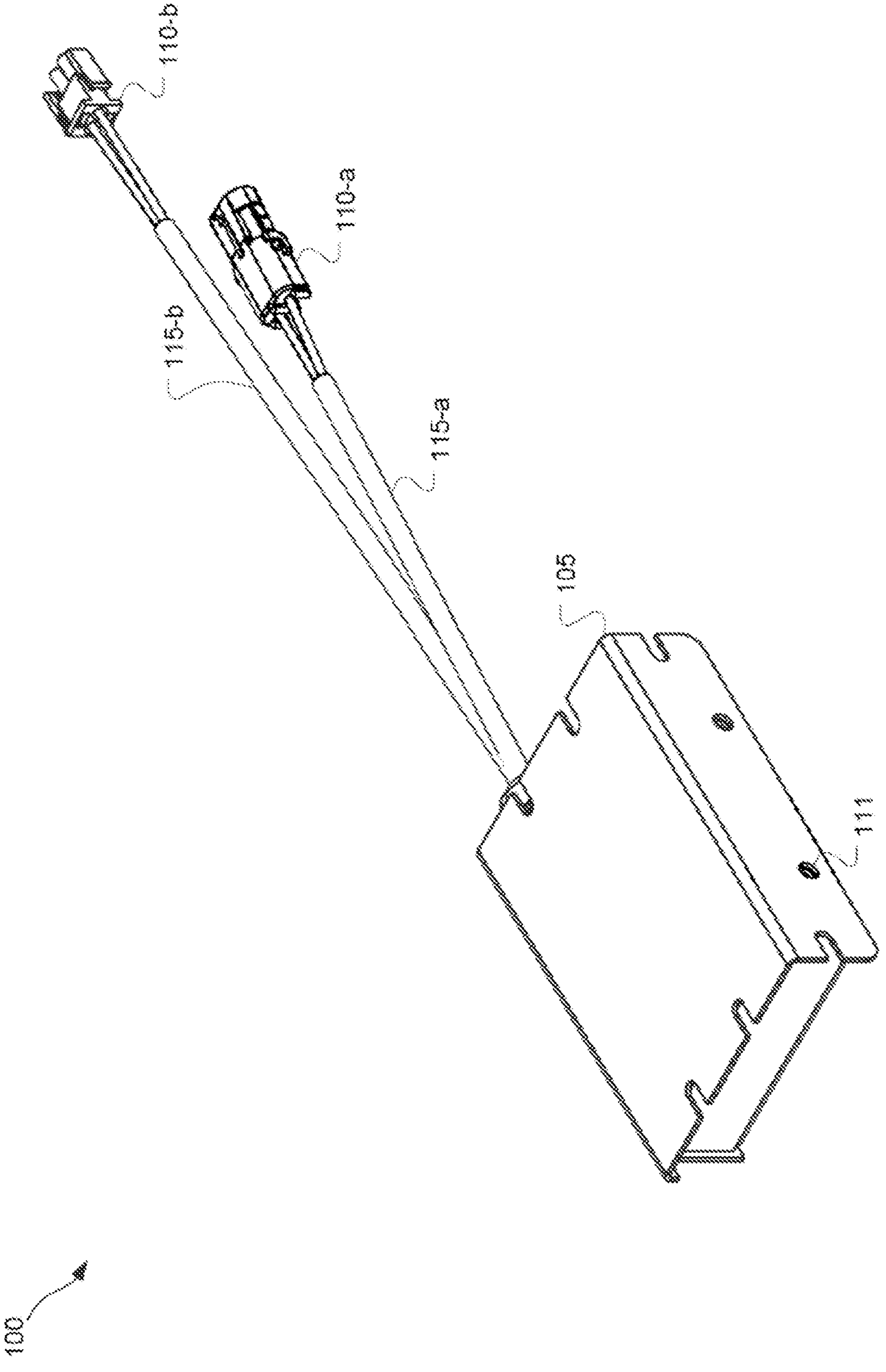
FIG. 1 illustrates a central power box, according to an embodiment of the present disclosure.

The word "exemplary" is used herein to mean "serving as an example, instance, or illustration." Any embodiment described herein as "exemplary" is not necessarily to be construed as preferred or advantageous over other embodiments.

The present disclosure relates generally to air purification for HVAC systems. In particular, but not by way of limitation, the present disclosure relates to systems, methods and apparatuses for electronic air purification in public transit vehicles.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Disclosed in detail below is an air ionization purification system capable of withstanding high shock environments, large temperature swings and ranges, and designed to fit within the compact HVAC system of public transit vehicles.

In some embodiments of the present disclosure, a central power box (or power management box) may be configured to handle input voltage variations (e.g., between 6 and 30V, between 18 and 72V, between 9 and 36V, etc.), handle overload and over voltage situations, provide short circuit protection, and/or tolerate vibrations. In other embodiments, the ozone levels generated by the ionization emitters (or ion emitters) may be under a predefined threshold limit, wherein the predefined threshold limit may be defined by Federal regulations. Additionally, or alternatively, the air purification system of the present disclosure may be designed to conform with electromagnetic compatibility (EMC) and/or electromagnetic interference (EMI) regulations, such as, but not limited to, EMI/EMC 50121-3-2 and/or UL867.

An aspect of the air ionization purification system of the present disclosure provides that one or more ion emitters coupled to and remote from the power management box may be placed within one or more air streams in a public transit vehicle. Such a configuration serves to simplify the installation process and improve the effectiveness of ionization and provides added flexibility for installation in public transit systems utilizing various HVAC systems. In some instances, the ion emitters may be remote from the power management box and may be mounted within the air handling system of the public transit vehicle, near the supply air within the ductwork of the public transit vehicle, or any other applicable location. Further, the power management box may be located or installed at any applicable location within the public transit vehicle (e.g., a DC power supply system in the public transit vehicle). In some embodiments, the air ionization purification system may be configured to utilize the HVAC evaporator blower airflow to distribute elevated charged ions generated by the ion emitters, which may serve to suppress dust, reduce airborne particulate matter and/or contaminants (e.g., via agglomeration), oxidize volatile organic compounds (VOCs), control unpleasant odors (e.g., via oxidation of odors and/or gas disassociation), and/or help control airborne pathogens (e.g., bacteria, viruses, molds) and various microbiological organisms, to name a few non-limiting embodiments. In other embodiments, the air ionization purification system may assist in reducing various microbiological contagions from the interior of public transit vehicles. In other embodiments, the air ionization purification system may facilitate in enhancing indoor air quality (IAQ), filter performance, and HVAC performance on public transit systems. In another embodiment, the air ionization purification system may also help control bacterial growth on evaporator coils of existing HVAC systems. It should be noted that, the extendable emitters may be used in addition to, or in lieu of standard filtration media previously installed in the public transit vehicle.

In some embodiments of the present disclosure, the central power box may be configured to handle the inconsistent DC power in a bus or another public transit vehicle. For instance, some buses may only provide up to 12 volts (V) or direct current (DC) voltage, while others may provide anywhere between 18V and 30V. In some embodiments, ion emitter performance may degrade when the input voltage to the ion emitter is less than a minimum threshold (e.g., optimal performance may be noted when the input DC voltage to the emitter is 24V, and the minimum threshold may be 10% under 24V-21.6V). To preempt such issues, the central power box may be configured for voltage management to ensure a consistent supply of DC voltage (e.g., 12V, 24V, etc.) to the ion emitters. For instance, the central power box may be configured to receive variable input voltages from the power supply of the public transit vehicle and provide a stable output voltage to the ion emitters. In some embodiments, the central power box may also be configured for overload or over voltage protection, and/or short circuit protection.

FIG. 1 illustrates a central power box 100 (also referred to as an ionizer unit or an emitter supply) for use in an electronic air cleaner or air purification system, according to an embodiment of the disclosure. In some embodiments, the central power box 100 comprises an enclosure 105 for housing the interior electronics of the central power box 100, one or more cables 115 (e.g., cable 115-*a*, cable 115-*b*) electronically coupled to the circuitry in the enclosure 105, and connectors 110 (e.g., connector 110-*a*, connector 110-*b*) for coupling the central power box 100 to one or more of a DC-DC converter, a dual emitter supply (e.g., a 24V DC dual emitter supply, a 12V DC dual emitter supply, etc.) or a remote ionizer element, further described in relation to the figures below. In some embodiments, the central power box 100 may be configured for providing a stable voltage to a remote ionizer element or emitter. In some embodiments, the remote emitter may be an example of a single polarity emitter configured to only generate one type of ions (e.g., only negative ions) or a dual polarity emitter configured to generate both positive and negative ions. In either case, the generated ions may be emitted from one or more brushes of the remote ionizer element.

In some embodiments, the central power box 100 may be an integrated unit with one or more emitters, and power (or voltage) management circuitry. For instance, in some embodiments, one or more emitter brushes (e.g., carbon fiber emitter brushes, shown as brushes 501 in FIG. 5) may be coupled to a side of the enclosure 105, for instance, in holes 111. In one non-limiting embodiment, two brushes (one positive and one negative) may be coupled to two holes 111 on the side of the enclosure 105. Upon receiving an input power or voltage, the brushes may emit charged (positive and negative) ions that may be distributed within the airspace of the public transit vehicle, for instance, using the ductwork and blowers in the public transit vehicle.

In some embodiments, the central power box 100 may be configured to be coupled to an output of a DC-DC converter or an emitter supply, such as a dual emitter supply, using one of the cable-connector pairs (e.g., connector 110-*b* and cable 115-*b*), while the other one of the cable-connector pairs (i.e., connector 110-*a* and cable 115-*a*) may be used to couple the central power box 100 to at least one ionizer element or emitter remote from the central power box 100. In such embodiments, the central power box 100 may or may not comprise brushes on the sides of the enclosure (not shown). For instance, the central power box 100 may serve as a power management box for adjusting the voltage provided to the one or more emitters to ensure the average ion interior duct airflow is above a threshold (e.g., average concentration in the passenger space for each polarity>5000 ions/cc, >7500 ions/cc, >10,000 ions/cc, etc.). It should be noted that, while the ion output near the emitter brushes may be in the millions, only a portion of the ions may reach the passenger space. Further, since the passenger space is more voluminous than the ductwork where the emitters are installed, the ion concentration in the passenger space is also lower. In some embodiments, the central power box 100 may be configured to operate from anywhere between-20 degrees Celsius and 140 degrees Celsius, although other operating temperature ranges are contemplated in different embodiments. For instance, in some embodiments, the central power box 100 may be designed to operate from between-40 degrees Celsius and 70 degrees Celsius. In some embodiments, the central power box 100 and/or air purification system may exhibit optimal performance when the airflow is at or under a threshold (e.g., 3600 cubic feet per minute (CFM), 4200 CFM, 5000 CFM, 6000 CFM, etc.). In some embodiments, the performance may be gauged based on the average concentration of ions in the passenger space, rate of decrease of airborne contaminants or particulate matter, or any other applicable metric. Some embodiments may include a feedback loop, for instance, one including a gauge of ion concentration at one or more locations within the passenger space. In some embodiments, the enclosure may be composed of shock resistant powder coated aluminum, or any other applicable material. In some embodiments, the weight of the central power management box may range from anywhere between 1 lbs and 4 lbs, for instance, between 2 and 3 lbs.

Figure 2:
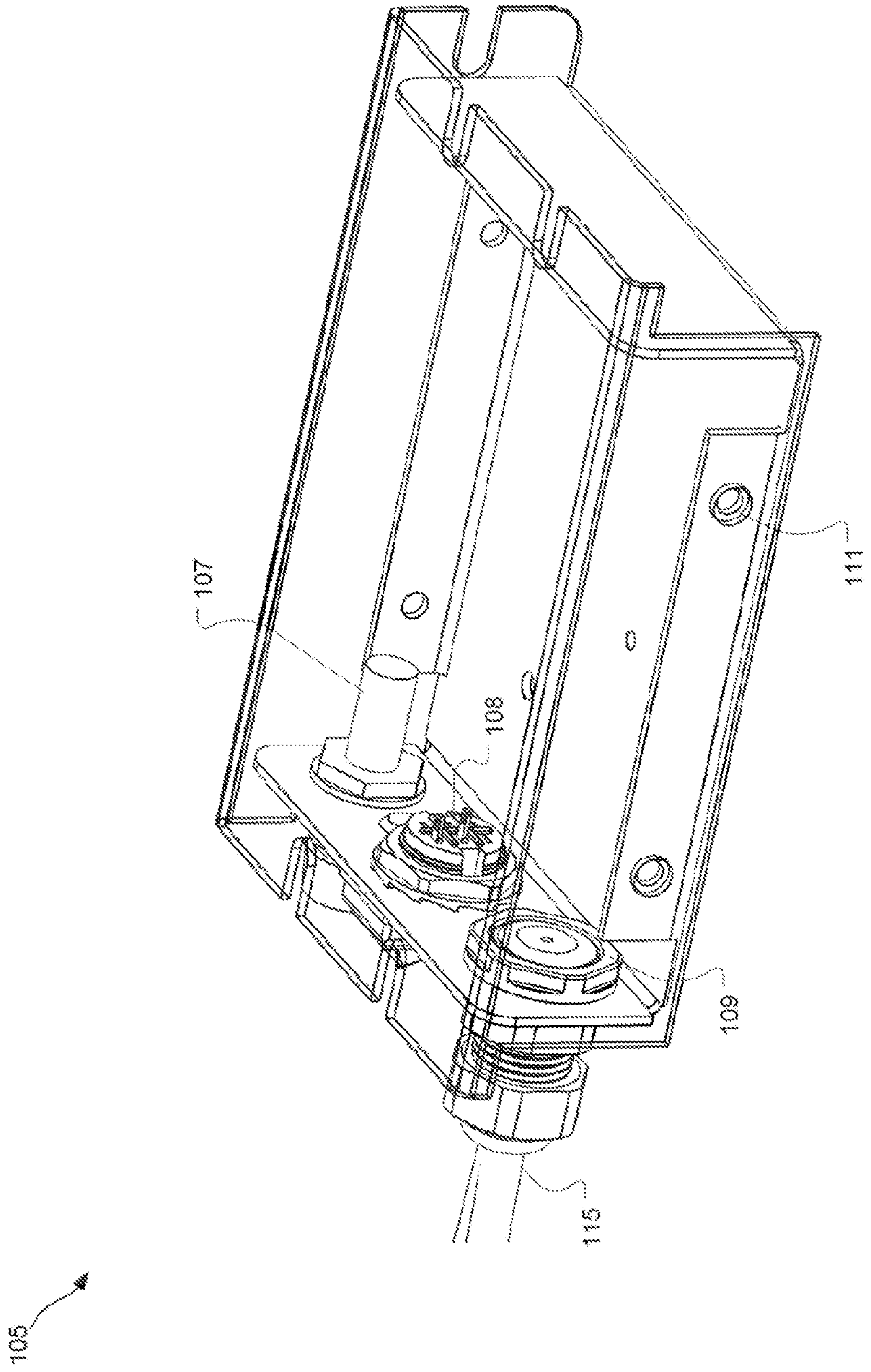
FIG. 2 illustrates a central power box, according to an embodiment of the present disclosure.

FIG. 2 is a transparent illustration of the central power box 100, showing some internal circuitry housed within enclosure 105. As shown, the enclosure 105 of the central power box 100 may comprise a fuse 107 (e.g., for cutting off electricity to a remote emitter, or alternatively, one or more brushes of the central power box 100 in case of overload), a switch 108, and a power generator connector 109. As shown, the two cables 115-*a* and 115-*b* may branch out from the power generator connector 109, where one of the cables may be coupled to a DC-DC converter or an emitter supply, while the other of the cables may be coupled to a remote emitter. In some embodiments, the air purification system of the current disclosure may utilize a DC-DC converter coupled at one end to the power supply of the transit system and coupled at another end to a central power box 100 or an emitter supply, such as a dual emitter supply.

Figure 3:
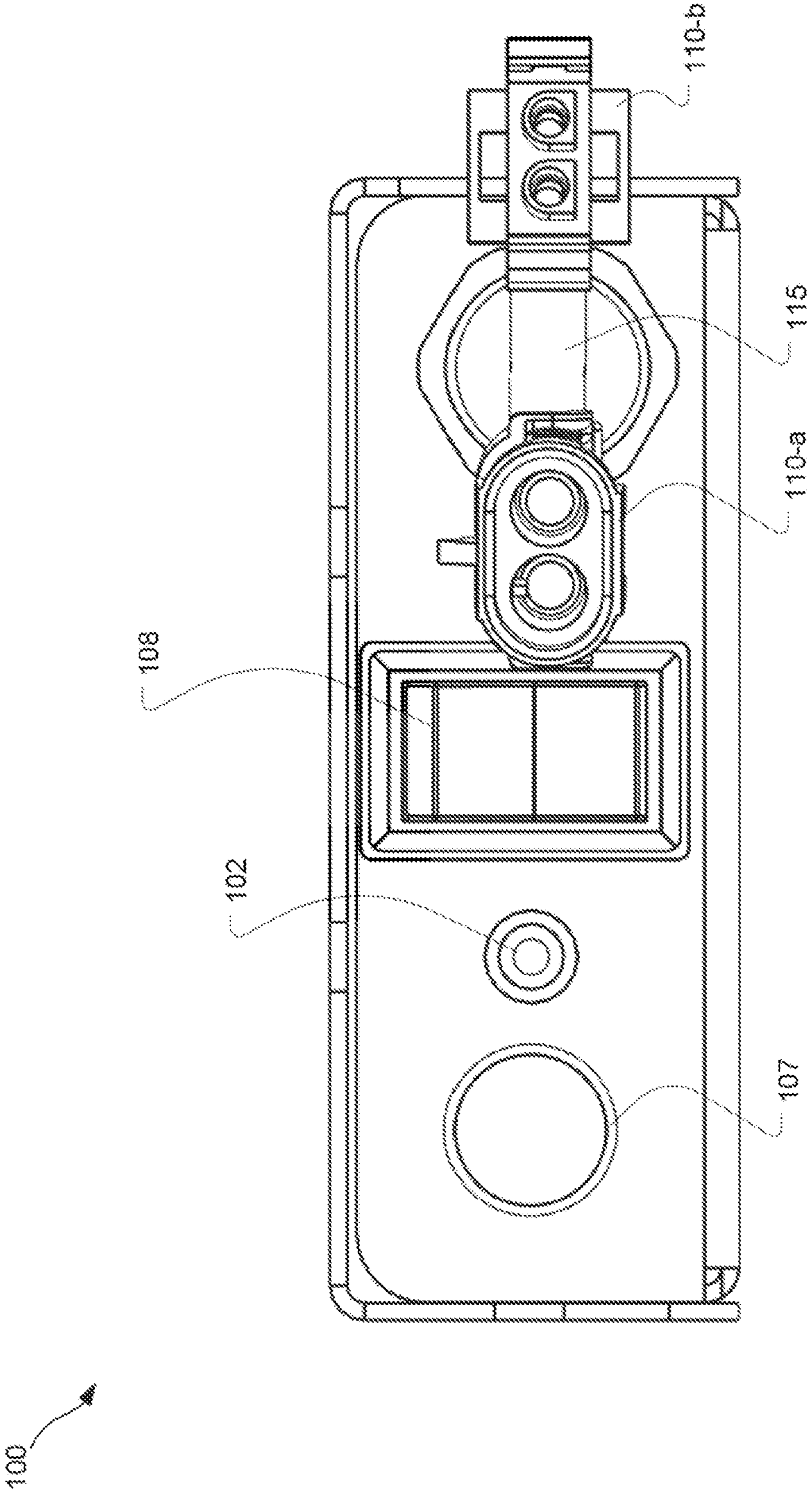
FIG. 3 illustrates a central power box, according to an embodiment of the present disclosure.
Figure 4:
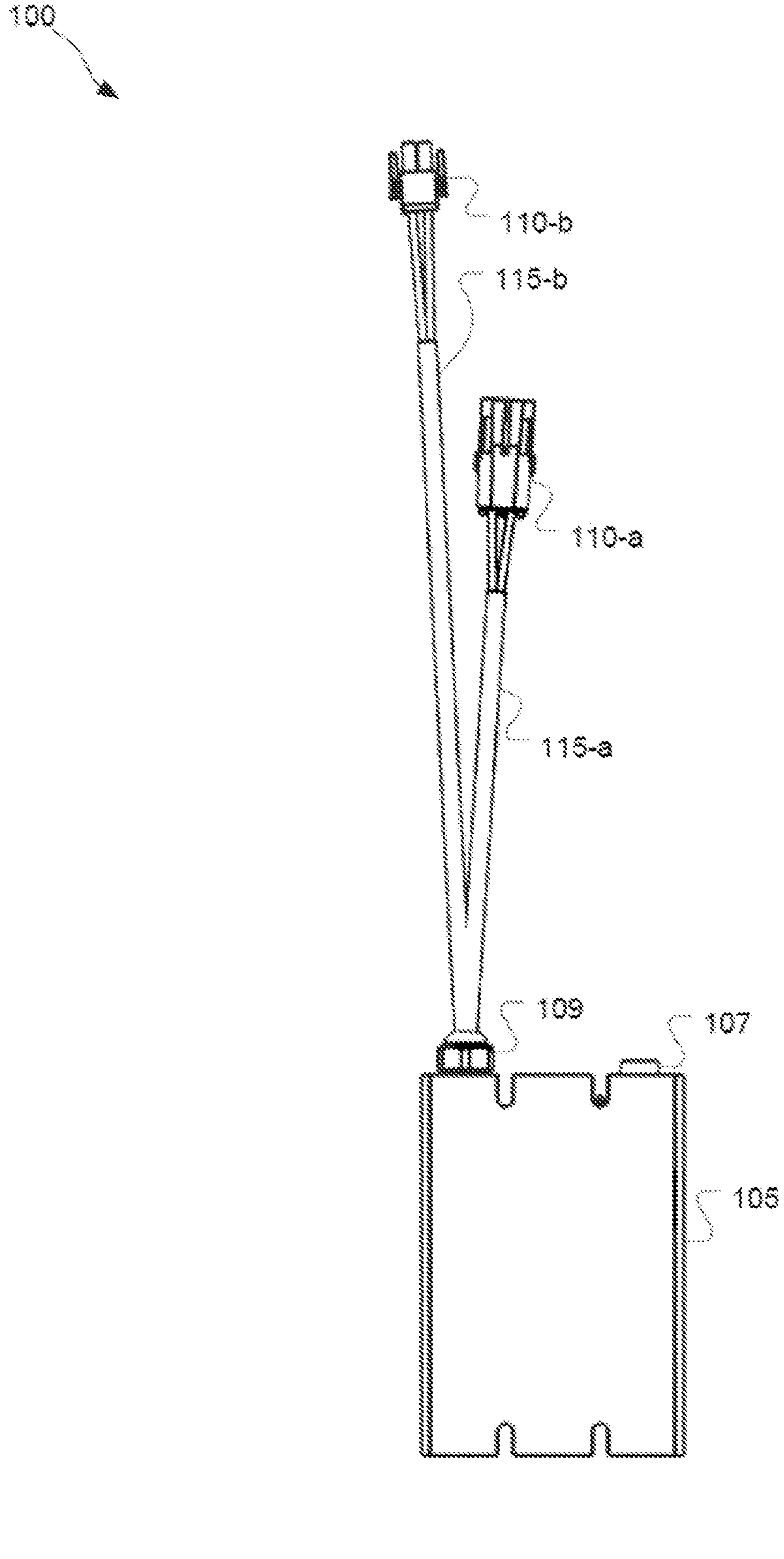
FIG. 4 illustrates a central power box, according to an embodiment of the present disclosure.

FIG. 3 illustrates a front view of the central power box 100 showing a switch 108, the fuse 107, and an optional LED 102. In some embodiments, the switch 108 may be used to control the power generator connector 109 seen in FIG. 2 (i.e., turn it on or off), which may in turn couple or decouple one or more of the remote ionizer element, a DC-DC converter, and a dual emitter supply, from the central power box 100. FIG. 4 illustrates a top view of the central power box 100.

Figure 5:
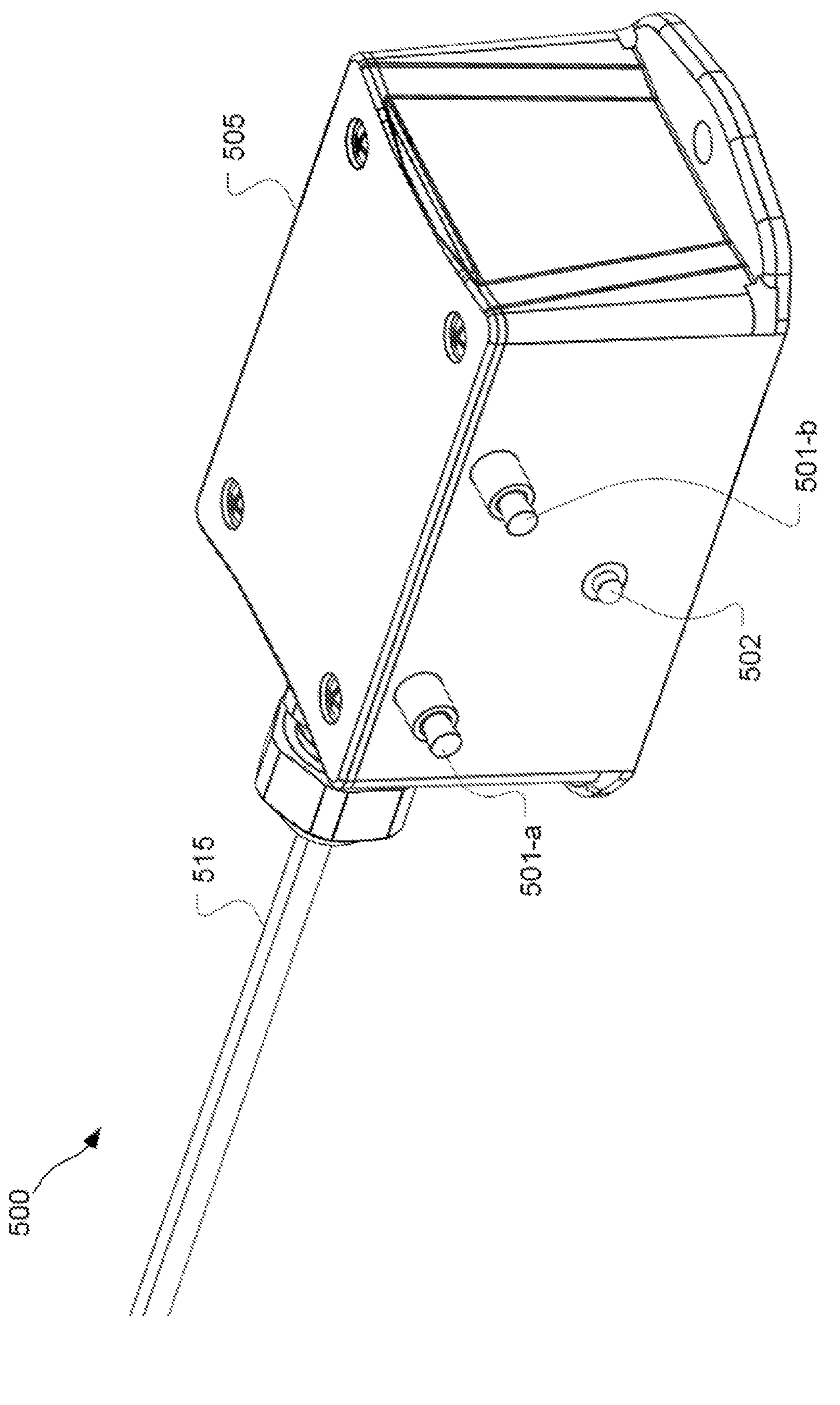
FIG. 5 illustrates a remote ionizer element or ion emitter, according to an embodiment of the present disclosure.

Turning now to FIG. 5 which illustrates a remote ionizer element 500, according to an embodiment of the disclosure. In some embodiments, the remote ionizer element 500 may also be referred to as a remote emitter, a remote dual emitter, or simply an emitter or dual emitter, and may comprise a cable 515, an emitter core (not shown), one or more brushes 501 (e.g., brush 501-*a*, brush 501-*b*), an optional LED 502, and an enclosure 505 housing the internal circuitry of the remote ionizer element 500. In some embodiments, the enclosure 505 may be composed of plastic (e.g., Acrylonitrile butadiene styrene (ABS) plastic) or another polymer, or any other applicable material. In some embodiments, the emitter core and/or cables may be removable and exchangeable to ensure optimal performance of the remote ionizer element 500. In one non-limiting embodiment, the emitter core and cables may be replaced every 4 years. Longer exchange times (e.g., every 6 years) are contemplated in different embodiments. The remote ionizer element 500 may be configured to couple to at least one of a central power box 100 or a dual emitter power supply, where the central power box 100 or dual emitter supply may be configured for power or voltage management (i.e., a central power management box).

In some embodiments, the remote ionizer element 500 may be an example of an extendable emitter remote from the central power box 100. In some embodiments, a plurality of remote ionizer elements 500 may be mounted within an air handling system of a public transit vehicle (e.g., public bus, tram, train), or alternatively, within the ductwork of the public transit vehicle (e.g., at or near a supply air vent). For instance, the 115 in FIG. 2 may couple to a plurality of remote ionizer elements 500. In some embodiments, the remote ionizer element 500 may be installed in the ducts, or alternatively, within the return air vents in the public transit vehicle. The remote ionizer element 500 may be configured to generate both positive and negative ions, for instance, via brushes 501-*a* and 501-*b*, respectively (or vice versa). In some embodiments, $10^3$, $10^4$, $10^5$, or $10^6$ of ions may be emitted from the brushes 501 every second.

Although a positive and negative ion emitter are shown, in other embodiments, it may be desirable to present a larger concentration of positive ions or a larger concentration of negative ions. In these cases, the numbers of emitters for positive and negative ions may be different, the size of the emitters for positive and negative ions may be different, and/or a voltage applied to the different emitters may be different—as dictated by the desired concentrations of positive and negative ions. Further, the dual polarity (positive and negative) ions emitted from the brushes 501 may be dispersed into the air space in the public transit vehicle, for instance, via a HVAC evaporator blower. The airflow from the HVAC evaporator blower may facilitate distribution of the elevated positive and negative ions within the public transit vehicle. In some embodiments, the ions may attach to the surface of air pollutants, as well as airborne pathogens (e.g., bacteria, viruses), and this attachment may serve to purify the air. For instance, the ions may cause airborne particles to clump (i.e., agglomerate) together, increasing their weight and causing them to settle on the floor, which facilitates in reducing airborne particulate matter ($PM_x$).

Figure 6:
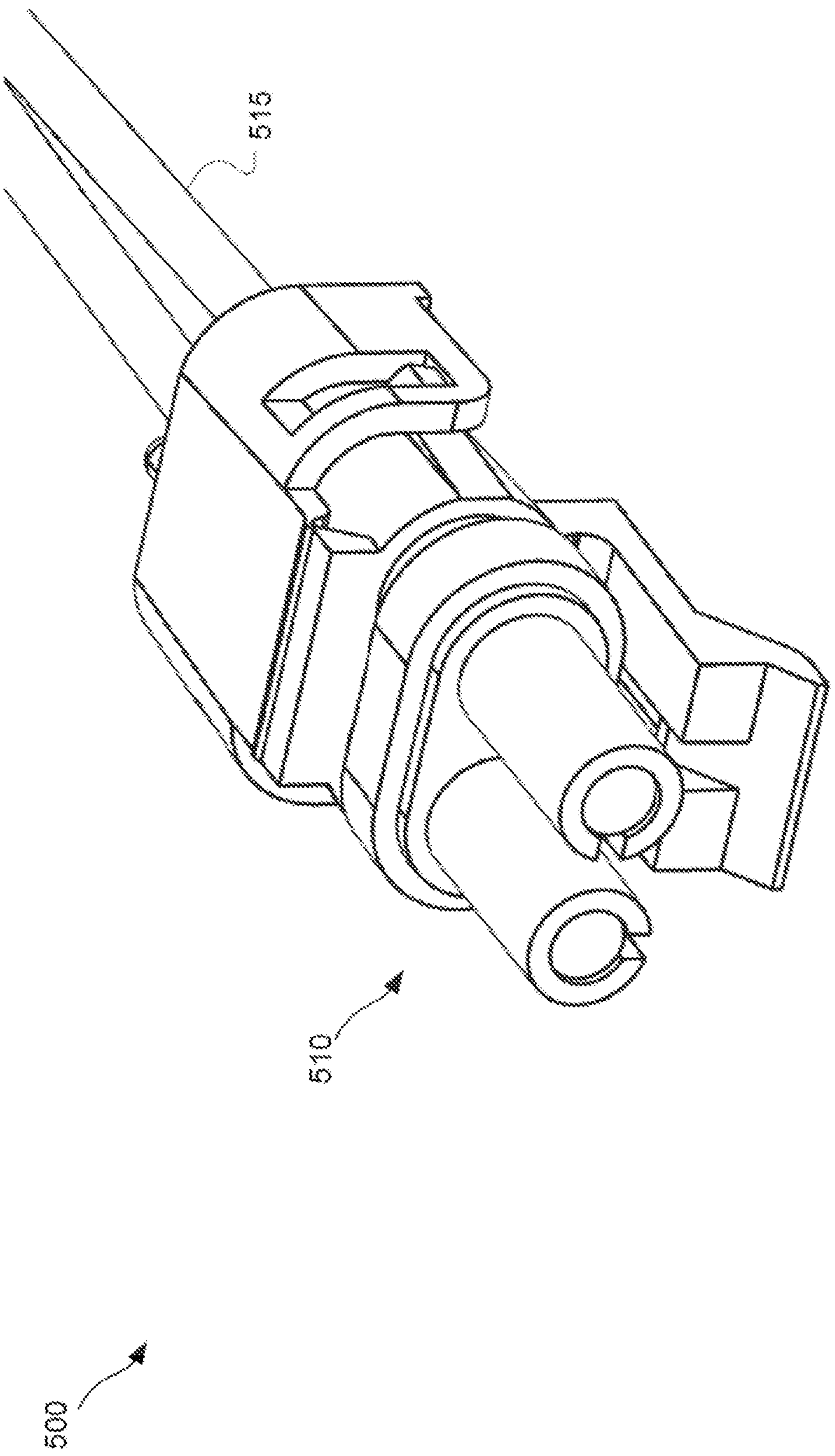
FIG. 6 illustrates a remote ionizer element or ion emitter, according to an embodiment of the present disclosure.

FIG. 6 illustrates a connector 510 of the remote ionizer element 500. In some embodiments, the remote ionizer element 500 may be coupled to one of a central power box 100 or a dual emitter supply using the connector 510 and cable 515. The connector and cable may be designed to carry power or voltage (e.g., 24V DC voltage) to the internal circuitry of the remote ionizer element 500, where the internal circuitry may be electronically coupled to the brushes 501 with or without an intermediary driver. In some embodiments, the brushes 501 may generate ions upon receiving an input voltage. For instance, the internal circuitry of the remote ionizer element 500 may apply a voltage to the brushes, which in turn generates an electric field at the tips of the fibers in the brushes and ionizes nearby air molecules).

Figure 7:
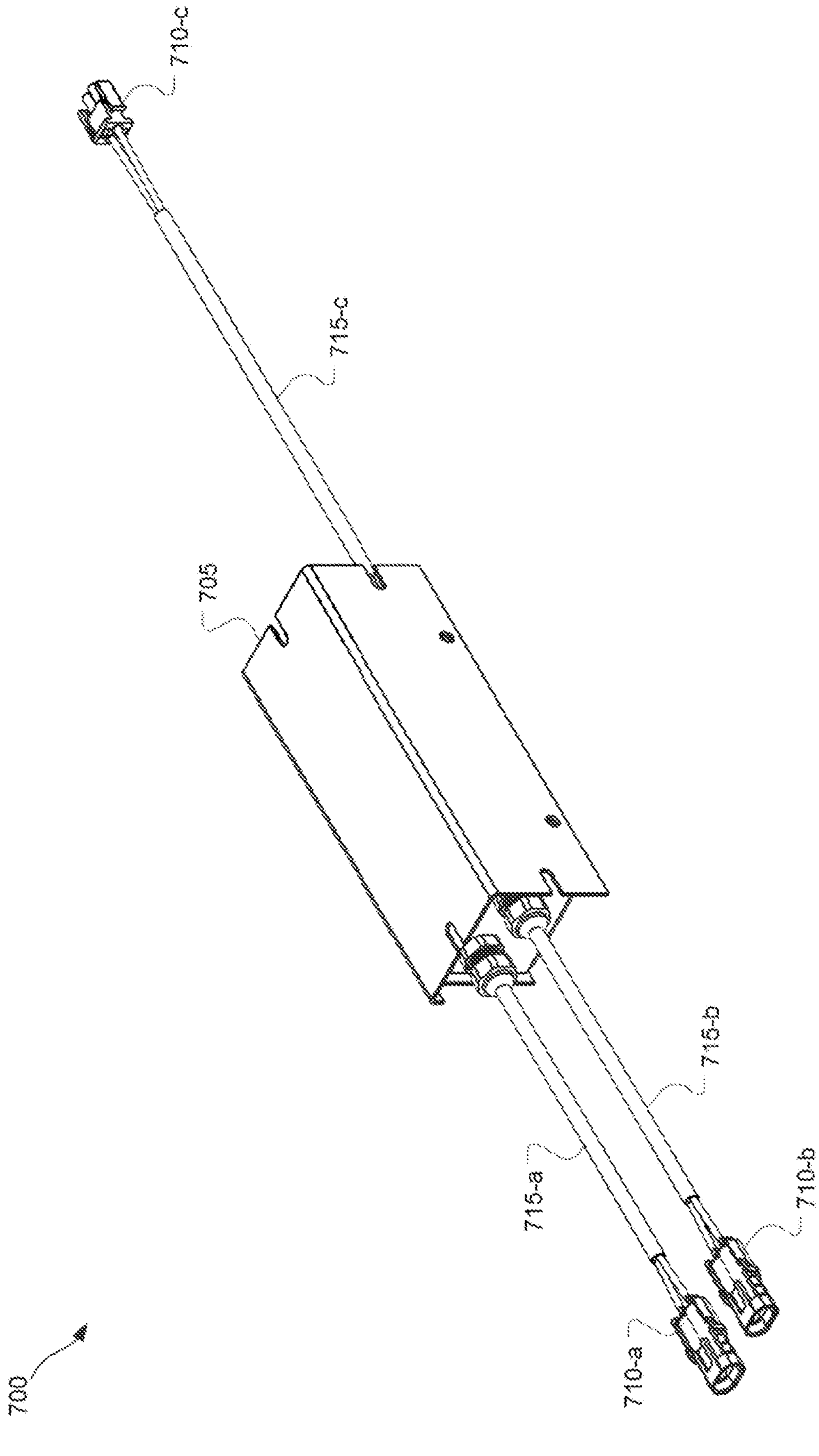
FIG. 7 illustrates a dual emitter supply, according to an embodiment of the present disclosure.

FIG. 7 illustrates an example of a dual emitter supply 700, according to an embodiment of the disclosure. As shown, the dual emitter supply 700 may comprise an enclosure 705, one or more cables 715 (e.g., cable 715-*a*, cable 715-*b*, cable 715-*c*), and one or more connectors 710 (e.g., connector 710-*a*, connector 710-*b*, connector 710-*c*) coupled to an end of the respective one of the cables. In some embodiments, the dual emitter supply 700 may be configured to provide a DC voltage (e.g., 12V DC, 24V DC, 36V DC, 48V DC, etc.) to one or more of the central power box 100 and/or one or more remote ionizer elements (e.g., remote ionizer element 500 in FIG. 5). In some embodiments, the dual emitter supply 700 may be directly coupled to the power system in the public transit vehicle, for instance, via the cable 715-*c* and connector 710-*c*, and thereby receives power from the vehicle's power system. In some other embodiments, the dual emitter supply 700 may be indirectly coupled to the power system in the public transit vehicle via a DC-DC converter (not shown). In one non-limiting embodiment, a DC-DC connector, such as the RSD-30 series converter provided by Mean Well, may be coupled to the connector 710-*c* and utilized to provide the input power and voltage to the dual emitter supply 700. In some embodiments, the DC-DC converter coupled to the dual emitter supply 700 may be configured to use input voltages such as 12V, 24V, 26V, 48V, 72V, 96V, and/or 110V, and provide one or more output voltages (e.g., 3.3V, 5V, 12V, 24V, etc.).

In some embodiments, each of the connectors 710-*a* and 710-*b* may be coupled to one remote ionizer element (e.g., a dual emitter, such as remote ionizer element 500 in FIG. 5). In some embodiments, the remote ionizer elements or dual emitters may be located in the return air plenum of the public transit vehicle, at an entrance to the evaporator blower motors, or within the passenger air duct. In some embodiments, multiple dual emitters may be located at different locations within the ductwork of the public transit vehicle. Preferably these locations have high airflow. In some embodiments, air flow level may be confirmed by testing ion concentration level using an ion measurement device (i.e., higher ion concentration levels may be indicative of the emitter being located in a region with higher air flow). In some embodiments, the cables 715 may be anywhere from 3-5 feet in length, although other lengths are contemplated in different embodiments. Additionally, or alternatively, the cable 515 coupled to the remote ionizer element 500 in FIG. 5 may be between 3-5 feet in length. In yet other embodiments, the combined length of the cable 715 (e.g., cable 715-*a* or cable 715-*b*) and the cable 515 may be 3-5 feet, or 4-8 feet, or 6-8 feet. It should be noted that, the cable lengths listed above are merely examples and not intended to be limiting. Different cable lengths (or combined cable lengths) may be utilized in other embodiments based on use case (e.g., type of public transit vehicle, such as bus, train, etc.).

Figure 8:
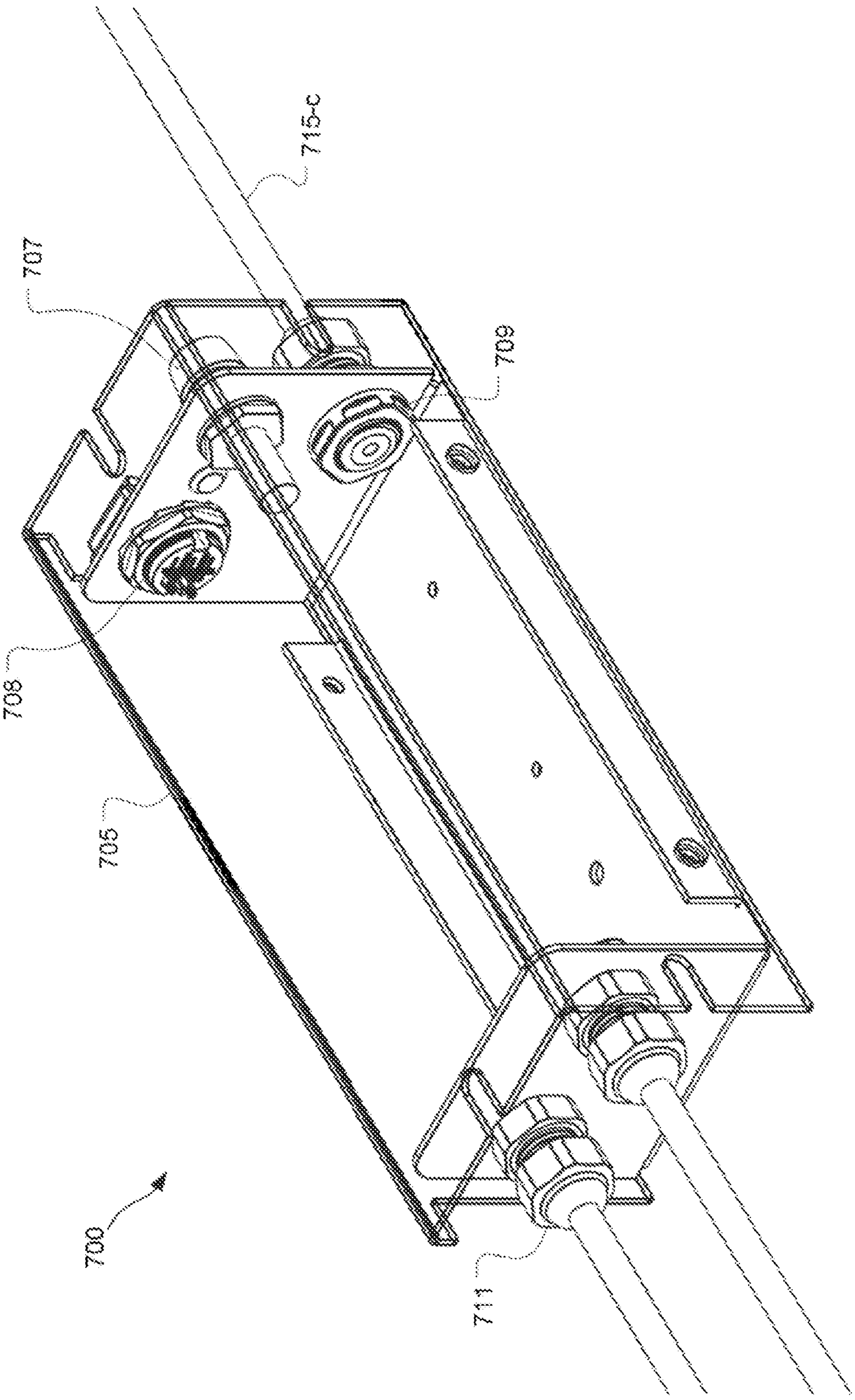
FIG. 8 illustrates a dual emitter supply, according to an embodiment of the present disclosure.

FIG. 8 illustrates a transparent detailed view of an inside of the enclosure 705 of the dual emitter supply 700, previously described in relation to FIG. 7. In some embodiments, the enclosure 705 may comprise a fuse 707 at or near the power input (e.g., from a DC-DC converter), where the fuse 705 may be configured to protect the internal components of the dual emitter supply 700 in the event of a short circuit and/or overload or overvoltage conditions. In some embodiments, the enclosure 705 may also comprise a switch 708 for turning the dual emitter supply 700 on or off. As shown, the dual emitter supply may receive input power or voltage (e.g., 24V DC voltage) from a DC-DC converter, or alternatively, directly from the power system of the public transit vehicle, where the input power or voltage may be received via cable 715-*c* at input port 709. In some embodiments, the dual emitter supply 700 (also referred to as a central power box) comprises one or more output ports 711 for providing power or voltage to one or more dual emitters coupled to the dual emitter supply 700 via cables 715 (e.g., cables 715-*a* and 715-*b* in FIG. 7).

Figure 9A:
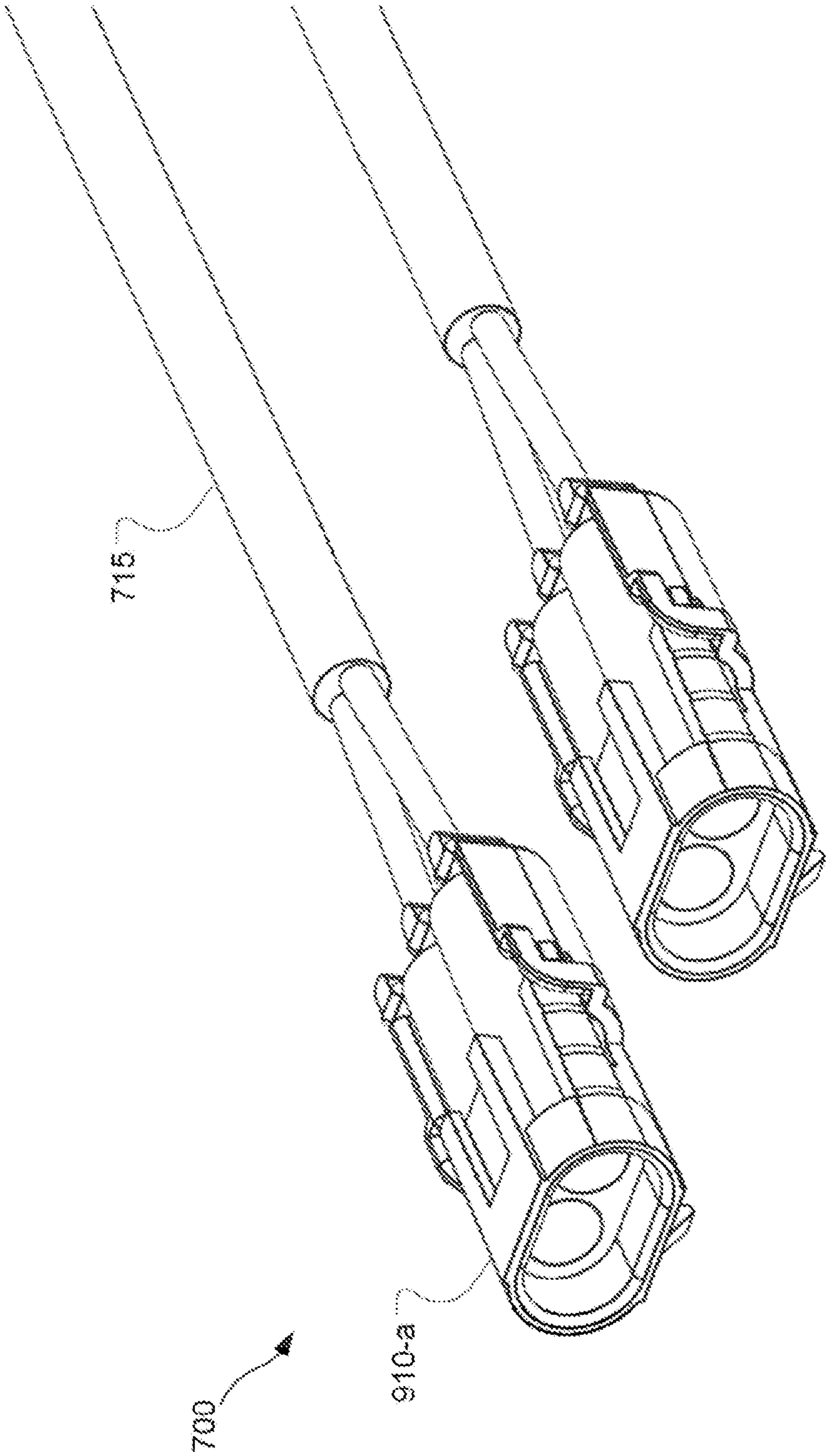
FIG. 9A illustrates exemplary connectors and cables for coupling to the dual emitter supply, according to an embodiment of the present disclosure.

FIG. 9A illustrates example connectors 910-*a* and cables 715 of the dual emitter supply 700. In this embodiment, each of the connector-cable pairs are coupled to one output port (e.g., output port 711 in FIG. 8) of the one or more output ports of the emitter supply 700. In some embodiments, the dual emitter supply 700 may be coupled to one or more remote ionizer elements or emitters using connectors 910-*a* and cables 715. It should be noted that the number of dual emitters that may be coupled to the dual emitter supply 700 is not intended to be limiting. For instance, in some embodiments, more than two dual emitters may be coupled to a single dual emitter supply. In one non-limiting embodiment, up to six extendable emitters may be coupled to a single dual emitter supply (or central power box).

Figure 9B:
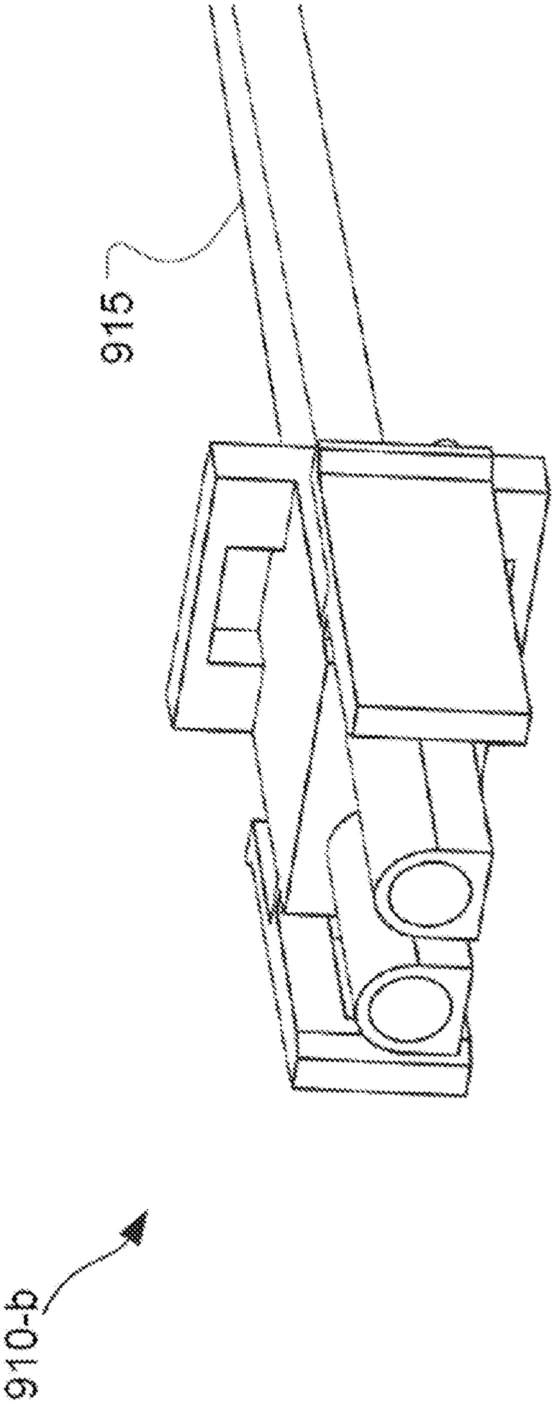
FIG. 9B illustrate exemplary connectors for coupling to the dual emitter supply, according to an embodiment of the present disclosure.
Figure 9C:
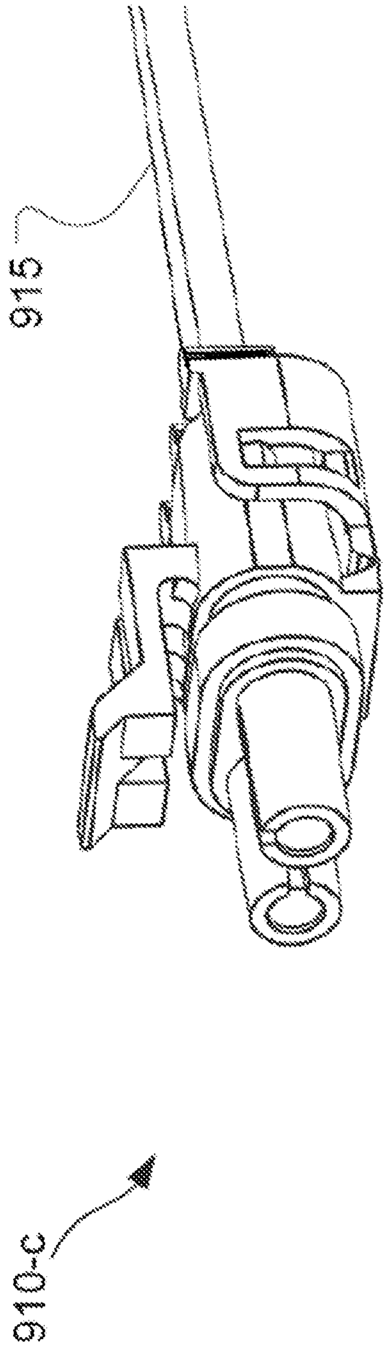
FIG. 9C illustrate exemplary cables for coupling to the dual emitter supply, according to an embodiment of the present disclosure.

FIGS. 9B and 9C illustrate example connectors 910-*b* and 910-*c*, respectively, and cables 915 for coupling a power converter (e.g., a DC-DC converter) to an input port of the dual emitter supply 700. In some embodiments, the connectors 910-*b* and/or 910-*c* may be configured to couple to an output of a DC-DC converter, or alternatively, directly to the power system in a public transit vehicle. In one non-limiting embodiment, the connector 910-*b* may be used when the dual emitter supply 700 is configured to receive a 24V input voltage, while the connector 910-*c* may be used when the dual emitter supply is configured to receive a 12V input voltage. Other types of connectors and cables (not shown here) with different operating voltage characteristics are contemplated in different embodiments.

Figure 10:
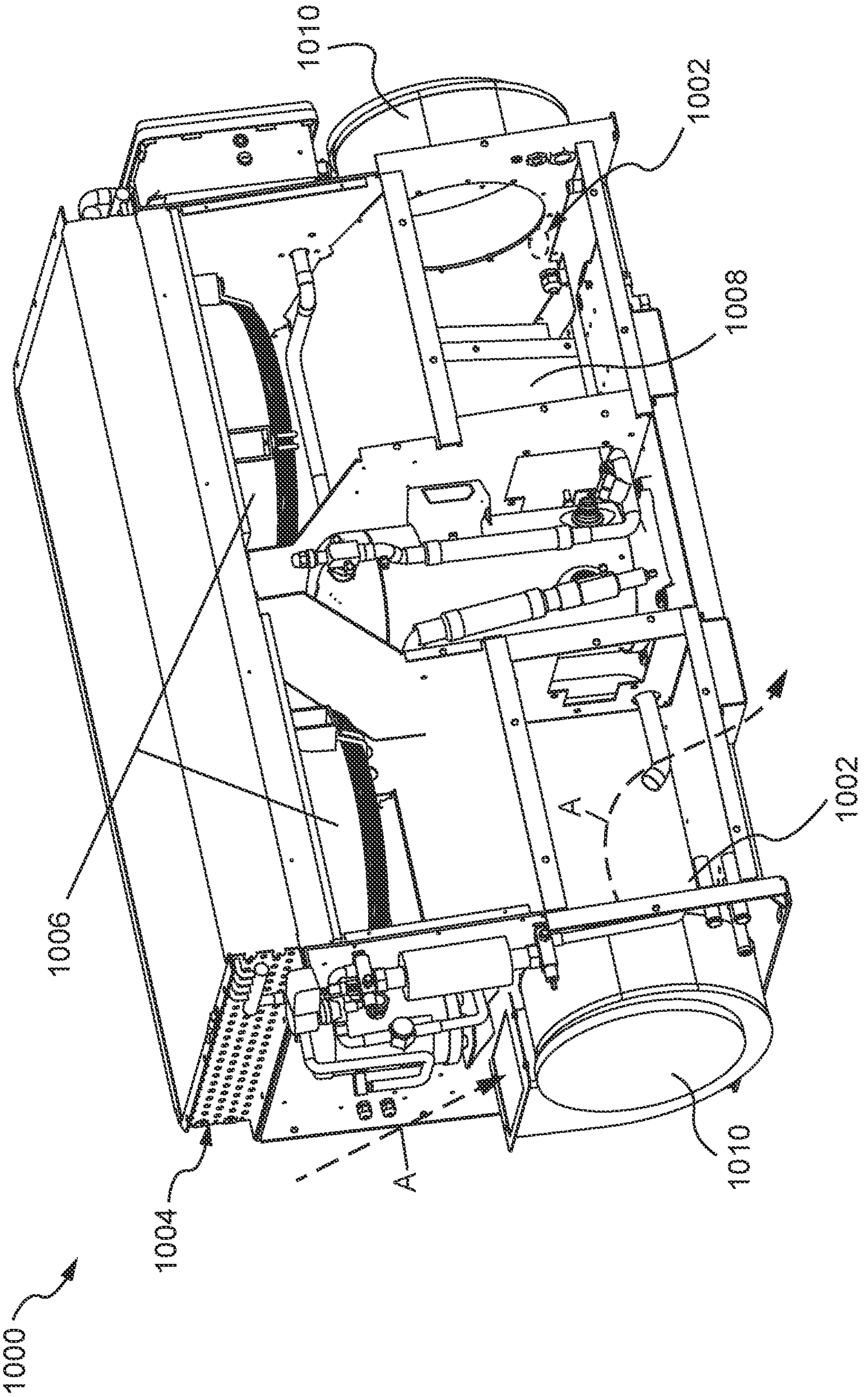
FIG. 10 illustrates a location for mounting one or more remote ionizer elements within an HVAC system of a public transit vehicle and with respect to an evaporator blower.

FIG. 10 illustrates one example location for mounting one or more remote ionizer elements (not shown), such as single emitter ionizers (e.g., negative ions only) or dual emitter ionizers (e.g., both positive and negative ions) within an HVAC system 1000 and with respect to an evaporator blower 1014. In this case, the HVAC system 1000 is an example of a rear mounted HVAC system 1000 in a public transit bus (not shown) comprising one or more of evaporator blowers 1010, evaporator coils 1004, condenser fans 1006, and passenger air ducts 1002. The one or more remote ionizer elements (or emitters) are mounted in one or more of the passenger air ducts 1002 slightly forward (depicted as a dashed line in FIG. 10) of the rear wall 1008 of the public transit bus and within the air flow A-A of the passenger air ducts 1002. The dashed line region depicted in the passenger air ducts 1002 is an exemplary location for mounting one of the one or more remote ionizer elements (not shown) but is importantly within the air flow A-A of the passenger air ducts 1002. In some embodiments, the one or more remote ionizer elements may be similar or substantially similar to the one described in relation to FIG. 5. It should be noted that, the location for mounting at least one of the one or more remote ionizer elements (again, as depicted by the dashed region pointed to by arrows 1002) in FIG. 10 is not intended to be limiting and is merely one example for placement of the one or more remote ionizer elements in a rear mounted HVAC system 1000.

Regarding FIG. 10, the rear mounted HVAC systems 1000 supplies air through the rear wall 1012 directly into the passenger air ducts 1008. Therefore, the one or more remote ionizer elements should be mounted within the first 3-5 feet of the rear wall 1012 on the street-side of the passenger air duct 1008, as described above. At a minimum, the unit should be mounted in a location within the passenger air ducts 1008 between the supply air from rear wall 1012 and a first louvre or vent (not shown) in the passenger air ducts 1008 that discharges air into the public transit vehicle. Most installations are approximately 3 feet from the rear wall 1012 but may vary. The one or more remote ionizer elements should be oriented to point towards the direction of the airflow A-A (rear mounted HVAC systems 1000 point towards the front of the public transit bus) to increase total saturation of ionization in the public transit bus. Alternatively, remote ionizer elements should be oriented toward a region where air flow is greatest, such as a center of an air passage cross section. The greater the total saturation of ionization, the more efficient the air ionization purification system at suppressing dust, reducing airborne particulate matter and/or contaminants (e.g., via agglomeration), oxidizing volatile organic compounds (VOCs), controlling unpleasant odors (e.g., via oxidation of odors and/or gas disassociation), and/or helping to control airborne pathogens (e.g., bacteria, viruses, molds) and various microbiological organisms, to name a few non-limiting embodiments. Thus, the remote ionizer element should ideally be mounted in an area of high airflow A-A (e.g., turbulent air; not to the side of the high airflow within the duct) because mounting in slow moving air could reduce the total saturation of ionization in the public transit bus.

Figure 11:
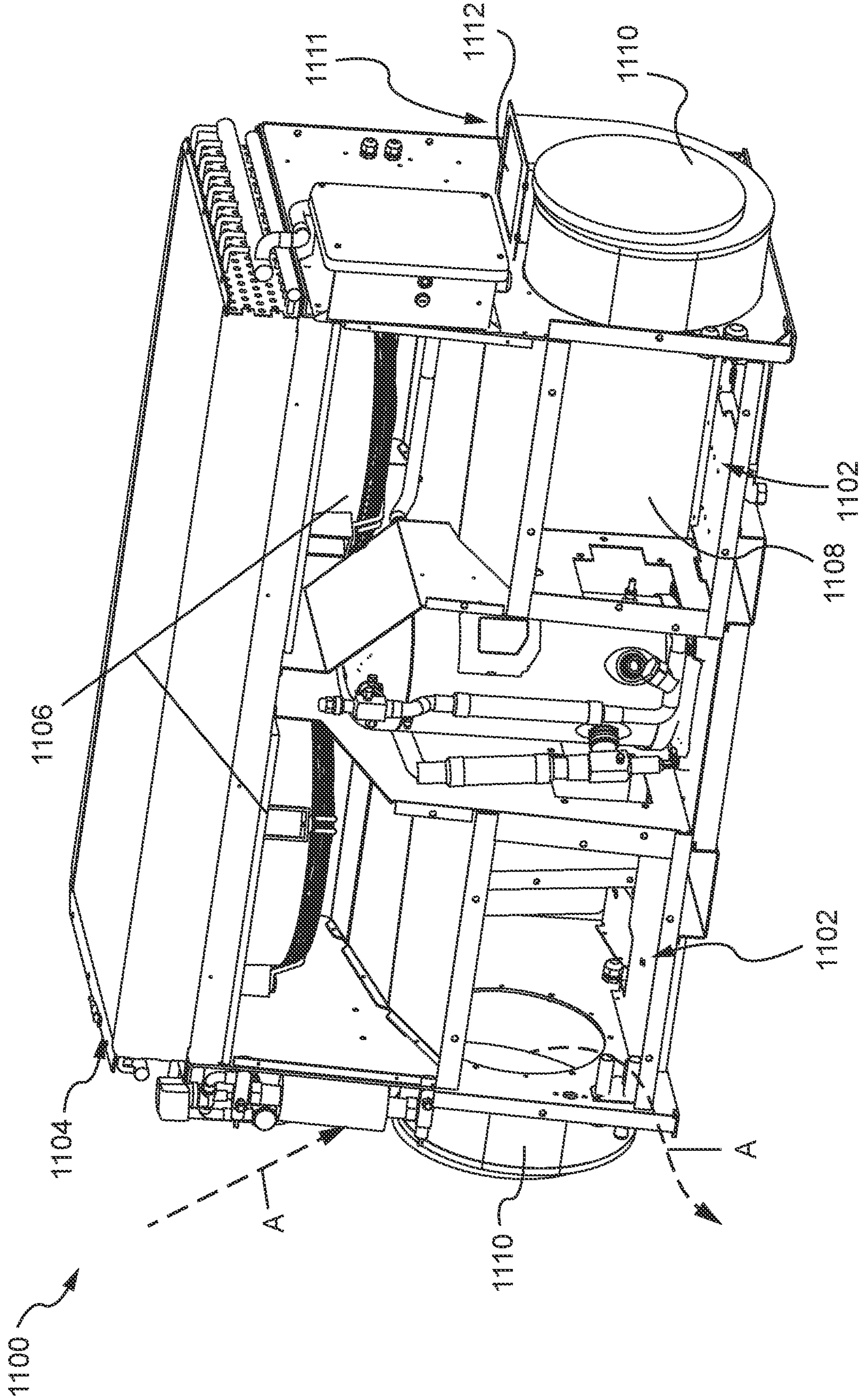
FIG. 11 illustrates another embodiment of a location for mounting one or more remote ionizer elements within an HVAC system of a public transit vehicle.

FIG. 11 illustrates another embodiment of a location for mounting one or more remote ionizer elements, such as the remote ionizer element 500 in FIG. 5, within an HVAC system 1100 of a public transit bus. Like FIG. 10, the one or more remote ionizer elements may be mounted within the rear mounted HVAC system 1100 of a public transit bus, for instance, between the evaporator coils 1104 and an opening 1112 of an evaporator blower 1110, but slightly forward of the rear wall 1108 (as described in FIG. 10 above). In some embodiments, the compact design of the air ionization purification system (i.e., since the emitters are remote from the power management box) may allow the emitters to be mounted or installed in a variety of locations within the ducting system of a public transit vehicle, including, but not limited to, within the return air plenum 1112, at an entrance 1111 to the evaporator blower motors (not shown), or within the passenger air ducts 1102. Alternatively, two remote ionizer elements could be mounted within the passenger air ducts 1102, for example on the dashed region shown in FIG. 10.

Figure 12:
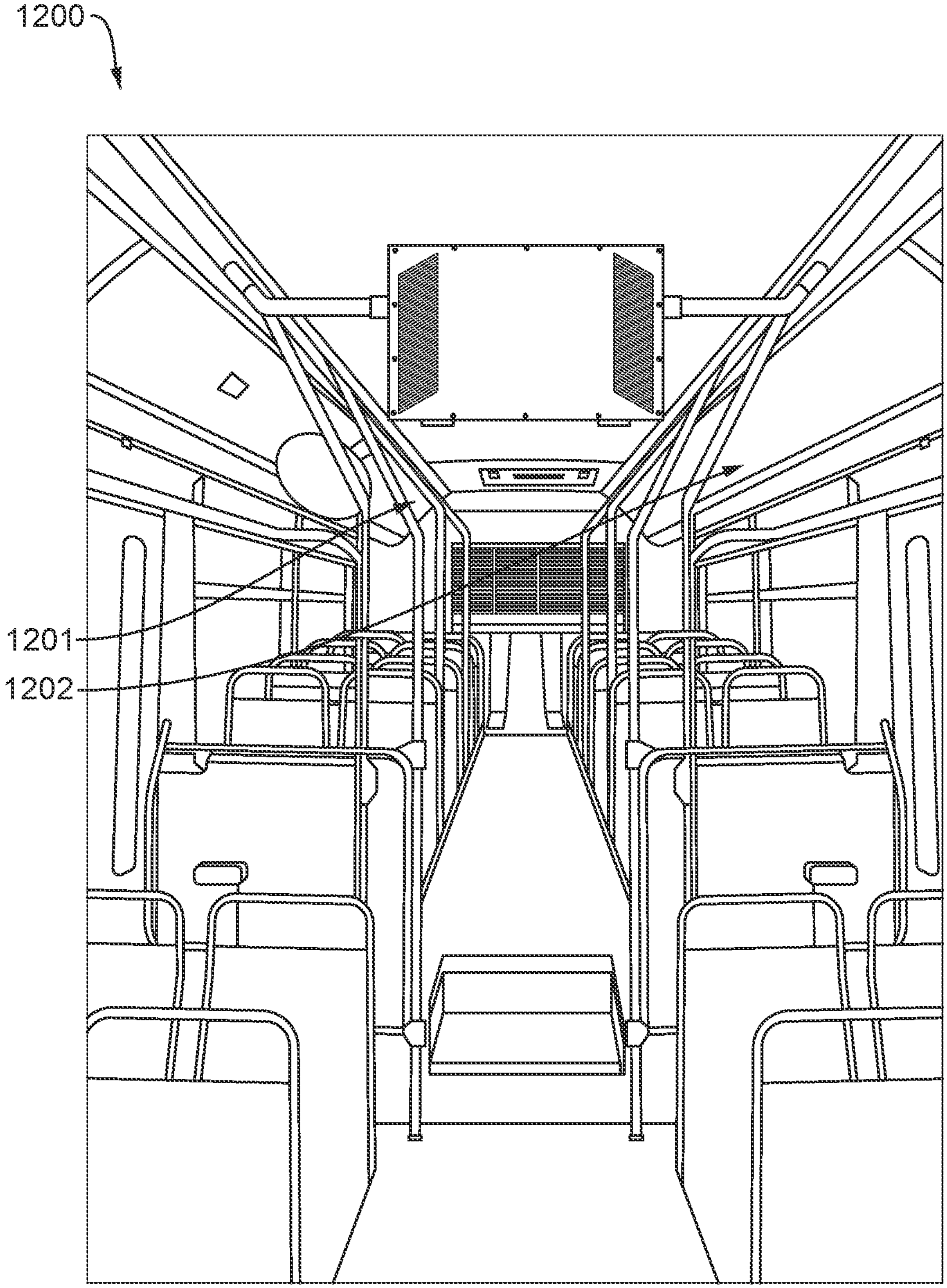
FIG. 12 illustrates an interior of a public transit vehicle showing two mounting locations for the one or more remote ionizer elements.

FIG. 12 illustrates an interior of a public transit bus 1200 showing two mounting locations (1201, 1202) for the one or more remote ionizer elements, previously described in relation to FIGS. 10 and 11. In some embodiments, the one or more remote ionizer elements may be mounted inside the passenger air ducts and forward of the interior rear wall of the public transit vehicle as described in relation to FIGS. 10 and 11, although other mounting locations are contemplated in different embodiments.

Figure 13:
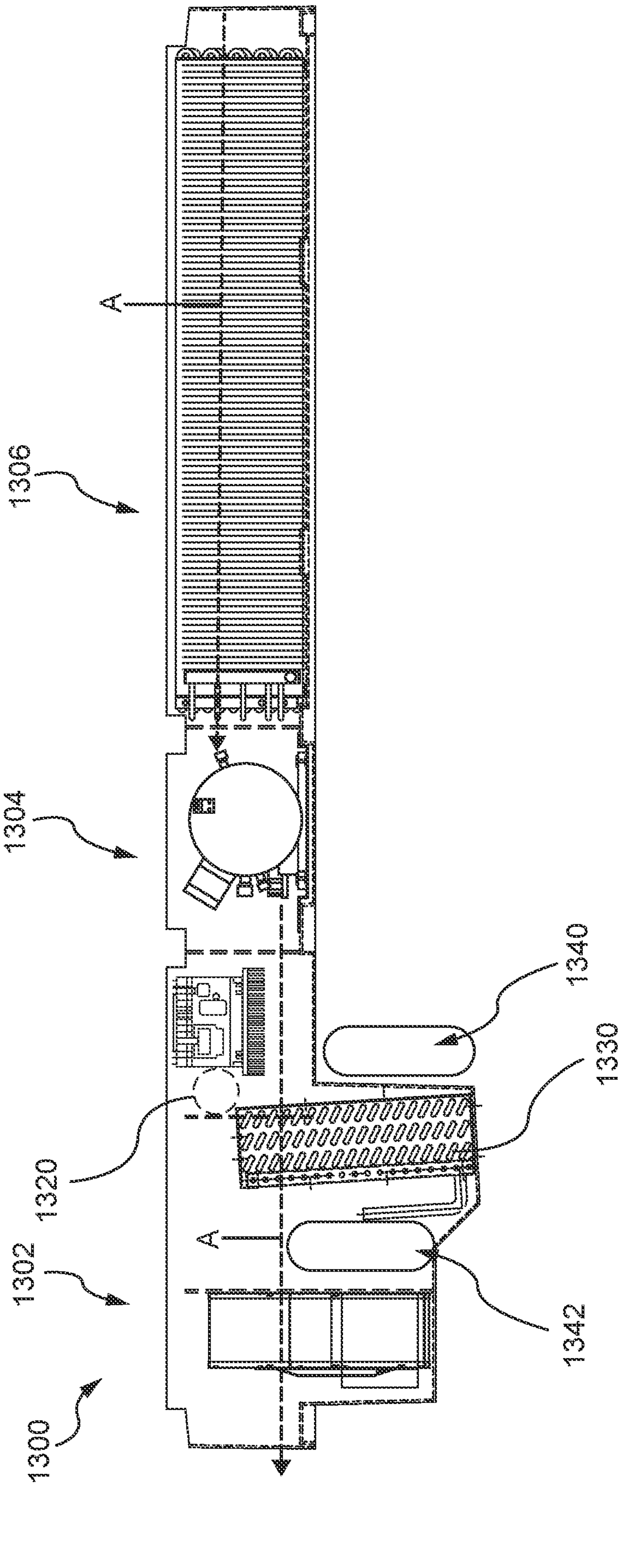
FIG. 13 illustrates a side elevation of an example of a roof mounted HVAC system installed in a public transit vehicle.
Figure 14:
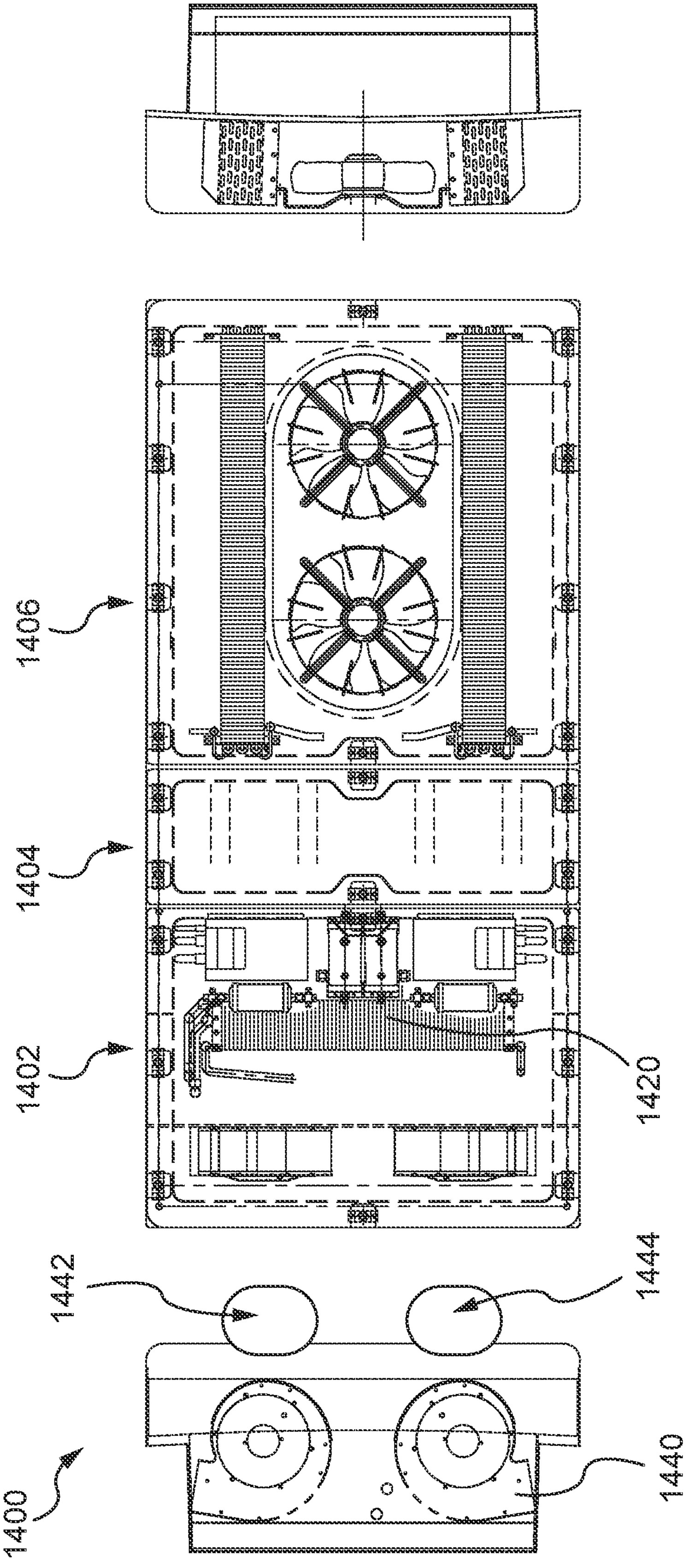
FIG. 14 illustrates a top view of a drop in roof mounted HVAC system installed in a public transit vehicle.
Figure 15:
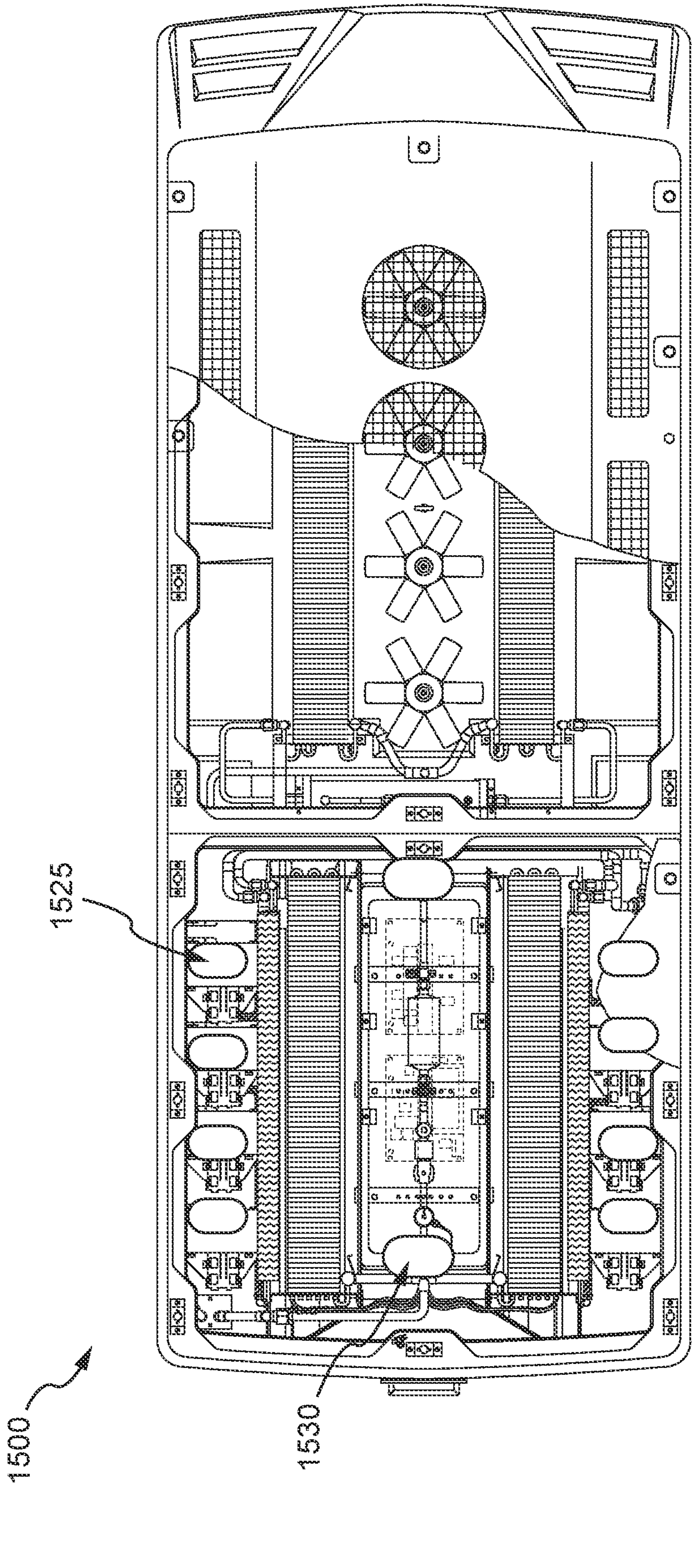
FIG. 15 illustrates another example of a roof mounted HVAC system in a public transit vehicle.

In some circumstances, a public transit vehicle, such as a bus, may comprise a roof mounted HVAC system, such as a traditional roof mounted HVAC system or a drop in roof mounted HVAC system (i.e., in lieu of a rear mounted HVAC system, such as HVAC system 1000 and/or 1100). FIGS. 13-15 illustrate various locations for mounting one or more remote ionizer elements (i.e., single or dual emitters) within such roof mounted HVAC systems.

FIG. 13 illustrates a side elevation of an example of a roof mounted HVAC system 1300 installed in a public transit bus (e.g., Flyer style bus). In this embodiment, the roof mounted HVAC system 1300 comprises three distinct sections: a condenser section 1302, a compressor section 1304, and an evaporator section 1306. Aspects of the current disclosure enable an air purification system to be installed within the ductwork of an existing HVAC system, such as the roof mounted HVAC system 1300. In some embodiments, the air purification system may comprise a central power management box (e.g., a dual emitter supply 700 shown in FIG. 7, a central power box 100 shown in FIG. 1) and one or more extendable emitters (e.g., dual emitter or remote ionizer element 500 shown in FIG. 5) coupled to the central power management box. In some embodiments, the central power management box may be mounted in the evaporator section (e.g., at location 1320) of the HVAC system 1300, although other locations are also contemplated in different embodiments. Areas 1340 in FIG. 13 illustrate second and third exemplary locations for mounting one or more remote emitters within the evaporator section 1302 of the roof mounted HVAC system 1300. In some embodiments, the one or more remote emitters may be mounted or installed upstream from an evaporator coil 1330 (e.g., at 1340). In other embodiments, the one or more emitters may be mounted or installed downstream from the evaporator coil 1330 (e.g., at 1342). The airflow through the roof mounted HVAC system 1300 is depicted in FIG. 13 as A-A. In some embodiments, a portion of the remote emitters may be installed upstream from the evaporator coil 1330, while the remainder may be installed downstream from the evaporator coil 1330 (e.g., one remote emitter upstream and two remote emitters downstream of the evaporator coil 1330). It should be noted that the remote emitters may be single or dual emitters. In one non-limiting example, dual carbon fiber remote emitters comprising two carbon fiber brushes (i.e., one for generating positive ions and one for generating negative ions) may be utilized.

FIG. 14 illustrates a top view of an example of a drop in roof mounted HVAC system 1400 installed in a public transit bus (or another public transit vehicle). In this embodiment, the central power management box (e.g., central power box 100 or dual emitter power supply) may be mounted within the evaporator section 1402 (e.g., at location 1420), while the one or more remote emitters may be installed at or near the evaporator blower openings (1442, 1444) (i.e., openings of evaporator blowers 1440). The regions 1442 and 1444 in FIG. 14 depict two example locations for mounting the emitters adjacent the evaporator blower openings. In this embodiment, the remote emitters are not mounted in the compressor section 1404 and condenser section 1406, but other locations for mounting the remote emitters is contemplated.

FIG. 15 illustrates another example of a roof mounted HVAC system 1500 (e.g., a traditional roof mounted HVAC system, as opposed to a drop in roof mount system) in a public transit vehicle. In some embodiments, the one or more emitters may be installed in a passenger duct (e.g., fore and aft of a supply air opening, not shown) and electronically coupled using one or more cables to a dual emitter supply (e.g., a 24V DC dual emitter supply, as previously described in relation to FIGS. 7 and 8). Additionally, or alternatively, emitters may be installed or mounted in a return air door opening (e.g., a return air vent) shown as regions 1530. In yet other embodiments, the emitters may be installed within evaporator blower openings of the HVAC system 1500, shown as regions 1525. In this embodiment, the HVAC system 1500 comprises eight evaporator blower openings, as opposed to the two seen in FIG. 14. In such embodiments, the air purification system may comprise at least two emitters, where the at least two emitters are installed at at least two locations (e.g., two or more of the regions 1525). In one non-limiting embodiment, the air purification system may comprise two emitters or an emitter pair, where the emitter pair may be installed across two of the regions 1525 (i.e., one emitter may be installed at a first of the regions 1525, while another emitter may be installed at a second of the regions 1525).

In one non-limiting embodiment, the central power box or dual emitter supply may be configured to receive a 24V DC voltage as input and draw less than 1 amp of current. In another embodiment, the central power box may be configured to receive anywhere between 18V and 72V DC voltage as input, for instance, between 9V and 36V, and draw up to 1.25 amperes (A) of current. In some embodiments, the DC-DC converter may be configured to receive an input voltage ranging anywhere between 9V and 72V, for instance, 12V, 24V, 48V, etc. Further, the DC-DC converter may be configured to output a DC voltage ranging anywhere between 3.3V and 24V, for instance, 12V or 24V. In some embodiments, the output rated current of the DC-DC converter may range anywhere between 1.25 A and 6 A. Further, the output rated power of the DC-DC converter may range anywhere between 19 watts (W) to 30 W, for instance, 19.8 W or 30 W. In some embodiments, the DC-DC converter may be designed to provide overload protection from anywhere between 105-135% of rated output power. In some embodiments, the DC-DC converter may be designed to provide over voltage protection up to 32.4V. In other embodiments, the DC-DC converter may be configured to receive an input DC voltage ranging anywhere between 40V and 160V, for instance, 110V. In yet other embodiments, the DC-DC converter may be configured to receive as input a 24V DC voltage and 0.9 A of current and provide as output a 24V DC voltage with a rated current of 0.625 A and rated power of 15 W. In some embodiments, the operating/working temperature range of the DC-DC converter may be anywhere between-10 degrees Celsius and +60 degrees Celsius, while the working humidity range may be anywhere between 20 and 90% non-condensing relative humidity (RH). In some embodiments, the DC-DC converter may be designed to tolerate 10-500 Hz vibrations and/or a gravitational force of up to 2 G. In some embodiments, the DC-DC converter may be configured to receive up to 36V DC input and provide a 12V DC output with a rated current of 1.25 A and a rated power of 15 W. For instance, the DC-DC converter may receive as input: 24V DC and 0.9 amps of current and provide as output: 12V DC and 1.25 amps of current. In some embodiments, the maximum ripple and noise of the DC-DC converter may be 120 mVp-p (peak-to-peak) or 150 mVp-p. In some other embodiments, the maximum ripple and noise may be under 100 mVp-p, for instance, 70 mVp-p, 60 mVp-p, 50 mVp-p, to name three non-limiting embodiments.

Figure 16:
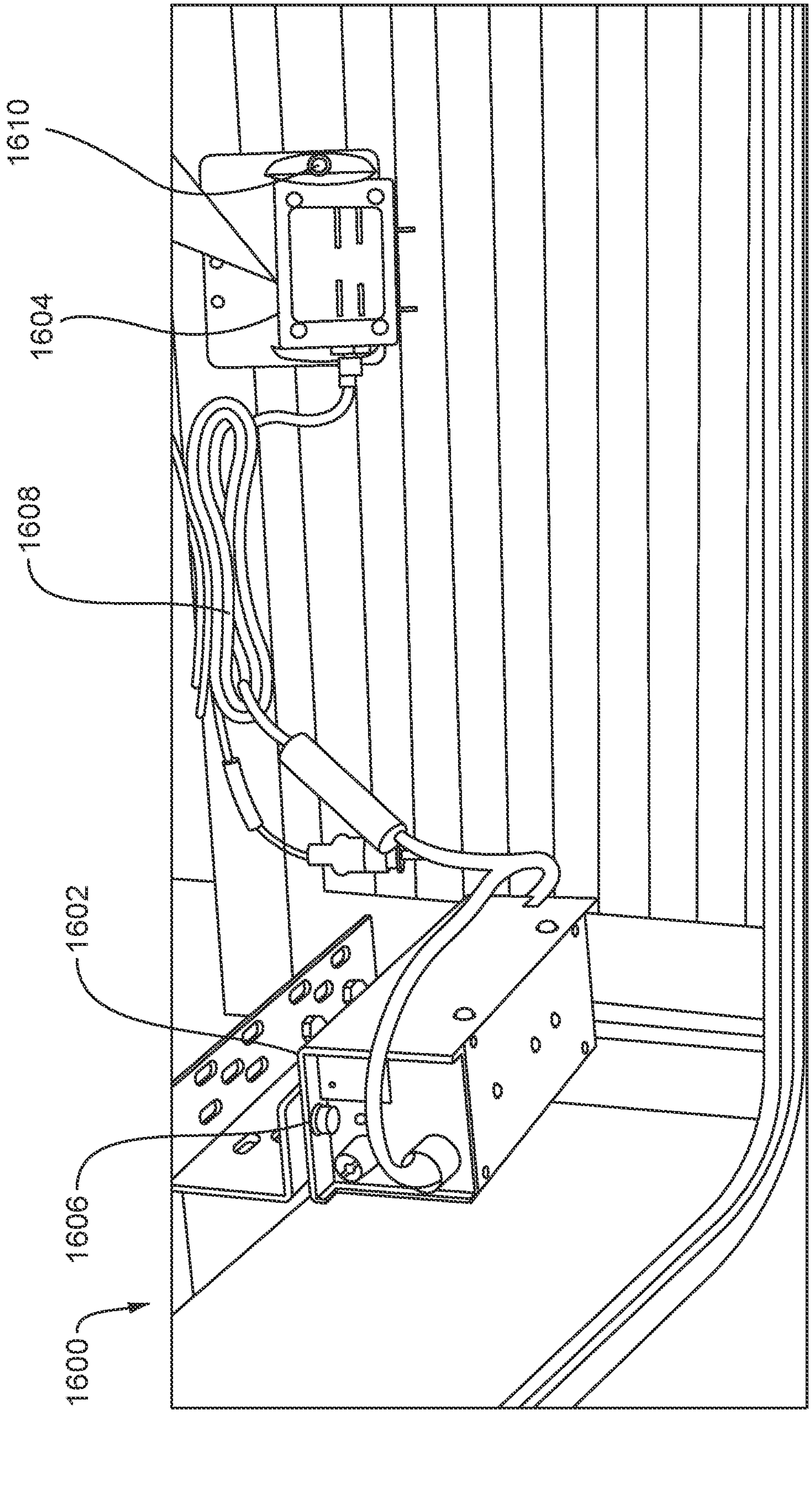
FIG. 16 illustrates an exemplary mounting location for the central power box and at least one of the one or more remote ionizer emitters.

FIG. 16 illustrates an exemplary mounting location for the central power management box 1602 (e.g., central power box 100 or dual emitter power supply) and at least one of the one or more remote ionizer emitters 1604, previously described in relation to FIGS. 10 and 11. The central power box 1602 and at least one of the one or more remote ionizer emitters 1604 are mounted in the return air plenum 1600 of the HVAC system of the public transit vehicle. The central power box 1602 is electronically connected to at least one of the one or more remote ionizer emitters 1604 by one or more cables 1608, as described in FIG. 1. The central power box 1602 and at least one of the one or more remote ionizer emitters 1604 are mounted to the return air plenum 1600 of the HVAC system of the public transit vehicle by first fasteners 1606 and second fasteners 1610, respectively.

It should be noted that the DC-DC converter specifications described above are merely embodiments and not intended to be limiting. Different types of DC-DC converters having various input and output voltages, or power characteristics are contemplated in different embodiments. Furthermore, DC-DC converters with different vibration limits and/or gravitation force (g-force) limits, as well as different working temperature and humidity ranges than those described above may also be utilized in other embodiments.

Although this disclosure has largely discussed application to buses, similar applications can include trains, trams, subways, airplanes, helicopters, and other forms of public and mass transit.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A high shock environment resistant electronic air purification system positioned within a heating, ventilation, and air-conditioning (HVAC) system of a public transit vehicle effective to remove particulate pollutants therefrom, comprising: a central power box positioned within and on an interior surface of the public transit vehicle and configured for voltage management, comprising:

a housing configured to house a first fuse and a housing interior circuitry, and at least two extendable emitter connectors electrically coupled through the housing to the housing interior circuitry; the first fuse coupled to the housing interior circuitry and configured to disrupt operation of the central power box in the event of a power overload;

wherein one or more first fasteners are configured to affix the central power box to at least the interior surface of the public transit vehicle without blocking or substantially restricting airflow of the HVAC system of the public transit vehicle; and at least one ion emitter positioned remotely from the central power box, and within the HVAC system of the public transit vehicle, comprising:

an ion emitter enclosure configured to house an ion emitter interior circuitry, one or more air ionizers coupled to the ion emitter interior circuitry, extending through the ion emitter enclosure, and configured to generate ions, and the ions configured to be dispersed by the HVAC system within an interior space of the public transit vehicle and attach to particulates in the air and exposed surfaces within the interior space of the public transit vehicle, wherein one or more second fasteners are configured to affix the at least one ion emitter to at least one interior surface of at least at one of in a return air plenum, at an entrance to an evaporator blower motor, or within a passenger air duct of the HVAC system of the public transit vehicle without blocking or substantially restricting an airflow of the HVAC system.

2. The high shock environment resistant electronic air purification system of claim 1, wherein the at least one ion emitter positioned remotely from the central power box is positioned at least 3 to 5 feet from the central power box.

3. The high shock environment resistant electronic air purification system of claim 1, wherein substantially restricting the airflow comprises inhibiting airflow through the HVAC system of the public transit vehicle where an ion output of the at least one ion emitter falls below a 5000 ions per milliliter average or the airflow is under 1,200 cubic feet per minute.

4. The high shock environment resistant electronic air purification system of claim 3, wherein the HVAC system comprises a roof mounted or rear mounted HVAC system of the public transit vehicle.

5. The high shock environment resistant electronic air purification system of claim 1, wherein the at least one ion emitter is a remote ionizer element.

6. The high shock environment resistant electronic air purification system of claim 5, wherein the remote ionizer element further comprises:

an emitter core configured to produce and disperse charged ions; and an operational indicator configured to display an operational status of the remote ionizer element.

7. The high shock environment resistant electronic air purification system of claim 6, wherein the remote ionizer element is configured to couple to the central power box by coupling the at least two extendable emitter connectors of the central power box to the at least two extendable emitter connectors of the remote ionizer element.

8. The high shock environment resistant electronic air purification system of claim 1, wherein the at least one ion emitter is a dual emitter supply.

9. The high shock environment resistant electronic air purification system of claim 8, wherein the dual emitter supply further comprises:

one or more output cables coupled to the ion emitter interior circuitry at one end and at least one of the at least two extendable emitter connectors at an opposite end by one or more output cables, and the one or more output cables configured to provide a direct current (DC) voltage to the central power box of the electronic purification system and at least one emitter.

10. The high shock environment resistant electronic air purification system of claim 9, wherein the dual emitter supply is configured to couple to the central power box by coupling the at least two extendable emitter connectors of the central power box to the at least two extendable emitter connectors of the dual emitter supply.

11. The high shock environment resistant electronic air purification system of claim 9, wherein the dual emitter supply is configured to couple to a DC-DC converter by coupling at least one extendable emitter connector of the DC-DC converter to at least one of the at least two extendable emitter connectors of the dual emitter supply.

12. The high shock environment resistant electronic air purification system of claim 1, wherein the central power box further comprises:

an operational indicator configured to display an operational status of the central power box.

13. A high shock environment resistant electronic air purifier positioned within a heating, ventilation, and air-conditioning (HVAC) system of a public transit vehicle effective to remove particulate pollutants therefrom, comprising:

an integrated central power box positioned within and on an interior surface of the public transit vehicle and configured for voltage management and charged ion disbursement, comprising:

a housing configured to house a first fuse, a housing interior circuitry, and at least one ion emitter; and first and second extendable emitter connectors electrically coupled through the housing to the housing interior circuitry;

the first fuse coupled to the housing interior circuitry and configured to disrupt operation of the integrated central power box in the event of a power overload; and the at least one ion emitter comprising:

one or more air ionizers coupled to the housing interior circuitry, extending through the housing, and configured to generate ions, and the ions configured to be dispersed by the HVAC system within an interior space of the public transit vehicle and attach to particulates in the air and exposed surfaces within the interior space of the public transit vehicle, wherein one or more fasteners are configured to affix the integrated central power box to at least one interior surface of at least at one of in a return air plenum, an entrance to an evaporator blower motor, or within a passenger air duct of the HVAC system of the public transit vehicle without blocking or substantially restricting airflow of the HVAC system.

14. The high shock environment resistant electronic air purifier of claim 13, wherein substantially restricting airflow comprises inhibiting airflow through the HVAC system of the public transit vehicle where an ion output of the at least one ion emitter falls below a 5000 ions per milliliter average or the airflow is under 1,200 cubic feet per minute.

15. The high shock environment resistant electronic air purifier of claim of claim 13, wherein the integrated central power box further comprises:

an operational indicator configured to display an operational status of the integrated central power box.

16. The high shock environment resistant electronic air purifier of claim 13, wherein the at least one ion emitter is an ionizer element.

17. The high shock environment resistant electronic air purifier of claim 16, wherein the ionizer element further comprises an emitter core configured to produce and disperse charged ions.

18. The high shock environment resistant electronic air purifier of claim 13, wherein a dual emitter supply is configured to couple to the integrated central power box by coupling the first extendable emitter connector of the integrated central power box to an extendable emitter connector of the dual emitter supply.

19. The high shock environment resistant electronic air purifier of claim 18, wherein the dual emitter supply comprises:

a brush configured to generate positive and negative ions.

20. The high shock environment resistant electronic air purifier of claim 19, wherein the dual emitter supply is configured to couple to a DC-DC converter.

* * * * *